US012619906B2

(12) United States Patent
Patel et al.

(10) Patent No.: US 12,619,906 B2
(45) Date of Patent: May 5, 2026

(54) INTERACTIVE MACHINE LEARNING OPTIMIZATION

(71) Applicant: INTERNATIONAL BUSINESS MACHINES CORPORATION, Armonk, NY (US)

(72) Inventors: Dhavalkumar C. Patel, White Plains, NY (US); Si Er Han, Xi'an (CN); Jiang Bo Kang, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1018 days.

(21) Appl. No.: 17/216,475

(22) Filed: Mar. 29, 2021

(65) Prior Publication Data

US 2022/0309391 A1     Sep. 29, 2022

(51) Int. Cl.
| | |
|---|---|
| *G06N 20/00* | (2019.01) |
| *G06F 8/34* | (2018.01) |
| *G06N 5/04* | (2023.01) |

(52) U.S. Cl.
CPC ............... *G06N 20/00* (2019.01); *G06F 8/34* (2013.01); *G06N 5/04* (2013.01)

(58) Field of Classification Search
CPC ............. G06N 20/00; G06N 5/04; G06F 8/34
See application file for complete search history.

(56) References Cited

U.S. PATENT DOCUMENTS

| | | | | |
|---|---|---|---|---|
| 10,860,466 | B1 * | 12/2020 | Baldwin | ............. G06F 11/3688 |
| 2014/0115007 | A1 * | 4/2014 | Harvey | ................... H04L 41/50 |
| | | | | 707/796 |

| | | | | |
|---|---|---|---|---|
| 2015/0149895 | A1 * | 5/2015 | Furman | ................. G06F 40/109 |
| | | | | 715/269 |
| 2018/0068221 | A1 * | 3/2018 | Brennan | ................. G06N 20/00 |
| 2019/0156196 | A1 | 5/2019 | Zoldi et al. | |
| 2019/0392252 | A1 | 12/2019 | Fighel et al. | |
| 2020/0012657 | A1 * | 1/2020 | Walters | .................. G06N 20/10 |

(Continued)

OTHER PUBLICATIONS

Zhang, "A neural network ensemble method with jittered training data for time series forecasting", 2007, Information Sciences, vol. 177 No. 23, pp. 5329-5346 (Year: 2007).*

(Continued)

*Primary Examiner* — Leonard A Sieger

(74) *Attorney, Agent, or Firm* — Lily Neff, Esq.; Heslin Rothenberg Farley & Mesiti P.C.; George S. Blasiak, Esq.

(57)     ABSTRACT

Methods, computer program products, and systems are presented. The method, computer program products, and systems can include, for instance: examining an enterprise dataset, the enterprise dataset defined by enterprise collected data; selecting one or more synthetic dataset in dependence on the examining, the one or more synthetic dataset including data other than data collected by the enterprise; training a set of predictive models using data of the one or more synthetic dataset to provide a set of trained predictive models; testing the set of trained predictive models with use of holdout data of the one or more synthetic dataset; and presenting prompting data on a displayed user interface of a developer user in dependence on result data resulting from the testing, the prompting data prompting the developer user to direct action with respect to one or more model of the set of predictive models.

20 Claims, 13 Drawing Sheets

(56) References Cited

U.S. PATENT DOCUMENTS

| | | | | |
|---|---|---|---|---|
| 2020/0193234 | A1 | 6/2020 | Pai et al. | |
| 2020/0201727 | A1 | 6/2020 | Nie et al. | |
| 2020/0380301 | A1* | 12/2020 | Siracusa | G06F 18/2193 |
| 2020/0380409 | A1* | 12/2020 | Seo | G06N 5/04 |
| 2021/0125068 | A1* | 4/2021 | Kim | G06F 18/15 |
| 2021/0256420 | A1* | 8/2021 | Elisha | G06N 5/04 |
| 2022/0101186 | A1* | 3/2022 | Sharma Mittal | G06V 10/751 |
| 2022/0292239 | A1* | 9/2022 | Kahraman | G06N 20/00 |

OTHER PUBLICATIONS

Zhang et al., "Learning Optimal Data Augmentation Policies via Bayesian Optimization for Image Classification Tasks", 2019, arXiv, v2, pp. 1-23 (Year: 2019).*

Bader et al., "Getafix: Learning to Fix Bugs Automatically", 2019, Proceedings of the ACM on Programming Languages, vol. 3 (2019), pp. 1-27 (Year: 2019).*

Santos et al., "Visus: An Interactive System for Automatic Machine Learning Model Building and Curation", 2019, HILDA '19: Proceedings of the Workshop on Human-In-the-Loop Data Analytics, vol. 2019, pp. 1-7 (Year: 2019).*

Hohman et al., "Understanding and Visualizing Data Iteration in Machine Learning", 2020, Proceedings of the 2020 CHI conference on human factors in computing systems, vol. 2020, pp. 1-13 (Year: 2020).*

Ding et al., "DAGA: Data Augmentation with a Generation Approach for Low-resource Tagging Task", 2020, arXIv, v1, pp. 1-13 ( Year: 2020).*

Saratchandran, "How Enterprise Software is Getting Intelligent Through Machine Learning", 2018, Medium, retrieved from https://medium.com/data-science/how-enterprise-software-is-getting-intelligent-through-machine-learning-4cafc2d7367e on Mar. 20, 2025 (Year: 2018).*

Raczko et al., "Comparison of support vector machine, random forest and neural network classifiers for tree species classification on airborne hyperspectral APEX images", 2017, European Journal of Remote Sensing, vol. 50 (2017), pp. 144-154 (Year: 2017).*

Fons et al., "Adaptive weighting scheme for automatic time-series data augmentation", Feb. 16, 2021, arXiv, v1, pp. 1-10 (Year: 2021).*

Xin et al., "Accelerating Human-in-the-loop Machine Learning: Challenges and Opportunities", 2018, DEEM'18: Proceedings of the Second Workshop on Data Management for End-To-End Machine Learning, vol. 2018, pp. 1-4 (Year: 2018).*

Kohli, et al., "Identifying and eliminating bugs in learned predictive models", DeepMind, Mar. 28, 2019, 12 pgs. Retrieved on Mar. 31, 2021 from the Internet URL: <https://deepmind.com/blog/article/robust-and-verified-ai>.

"TSimulus—A realistic time series generator", 2016, 2 pgs. Retrieved on Mar. 31, 2021 from the Internet URL: <https://simulus.readthedocs.io/en/latest/>.

Herlambang, "Data Generator for Supervised Time Series", kerasgenerator, Oct. 9, 2019, 29 pgs. Retrieved on Mar. 31, 2021 from the Internet URL: <https://kerasgenerator.bagasbgy.com/articles/timeseries.html>.

Yldrm, "Time Series Analysis: Creating Synthetic Datasets", Towards Data Science, May 16, 2020, 9 pgs. Retrieved on Mar. 31, 2021 from the Internet URL: <https://towardsdatascience.com/time-series-analysis-creating-synthetic-datasets-cf008208e014>.

Kang et al., "GRATIS: GeneRAting Time Series with diverse and controllable characteristics", 2019, 2 pgs. Retrieved on Mar. 31, 2021 from the Internet URL: <https://robjhyndman.com/publications/tsgeneration/>.

Kang et al., "GRATIS: GeneRAting Time Series with diverse and controllable characteristics", 2019, 38 pgs. Retrieved on Mar. 31, 2021 from the Internet URL: <https://arxiv.org/ftp/arxiv/papers/1903/1903.02787.pdf>.

Goswami, "tsBNgen, a Python Library to Generate Synthetic Data From an Arbitrary Bayesian Network", MarketTechPost, Sep. 15, 2020, 3 pgs. Retrieved on Mar. 31, 2021 from the Internet URL: <https://www.marktechpost.com/2020/09/15/tsbngen-a-python-library-to-generate-synthetic-data-from-an-arbitrary-bayesian-network/>.

Wen, "TSAUG: An Open-Source Python Package for Time Series Augmentation", Arundo, Nov. 20, 2019, 5 pgs. Retrieved on Mar. 31, 2021 from the Internet URL: <https://www.arundo.com/arundo_tech_blog/tsaug-an-open-source-python-package-for-time-series-augmentation>.

Tadayon, et al., "tsBNgen: A Python Library to Generate Time Series Data from an Arbitrary Dynamic Bayesian Network Structure", Sep. 9, 2020, 4 pgs. Retrieved on Mar. 31, 2021 from the Internet URL: <https://arxiv.org/pdf/2009.04595.pdf>.

Schwartz, B., "Generating Realistic Time Series Data", Jan. 24, 2014, 2 pgs. Retrieved on Mar. 31, 2021 from the Internet URL: <https://www.xaprb.com/blog/2014/01/24/methods-generate-realistic-time-series-data/>.

"Getting Started", SDV, MIT Data to AI Lab, 2018, 2 pgs. Retrieved on Mar. 31, 2021 from the Internet URL: <https://sdv.dev/SDV/getting_started/index.html>.

"Keras TimeseriesGenerator tutorial", 15 pgs. Retrieved on Mar. 31, 2021 from the Internet URL: <https://github.com/Tony607/Keras_TimeseriesGenerator/blob/master/TimeseriesGenerator.ipynb>.

"TSimulus—A realistic time series generator", Cetic A.S.B.L., 2016, 2 pgs. Retrieved on Mar. 31, 2021 from the Internet URL: <https://tsimulus.readthedocs.io/en/latest/>.

Herrera, et al., "A Time Series Simulator Processor for NiFi", Apr. 9, 2018, 4 pgs. Retrieved on Mar. 31, 2021 from the Internet URL: <https://github.com/hashmapinc/nifi-simulator-bundle>.

Lichtenwalner, "Modeling Seasonal Data", Ocean Data Labs, Mar. 24, 2020, 19 pgs. Retrieved on Mar. 31, 2021 from the Internet URL: <https://datalab.marine.rutgers.edu/2020/03/modeling-seasonal-data/>.

Uchidalab, "time series augmentation", 6 pgs. Retrieved on Mar. 31, 2021 from the Internet URL: <https://github.com/uchidalab/time_series_augmentation/blob/master/example.ipynb>.

Terryum, "Data Augmentation For Wearable Sensor Data", 3 pgs. Retrieved on Mar. 31, 2021 from the Internet URL: <https://github.com/terryum/Data-Augmentation-For-Wearable-Sensor-Data>.

RainBoltz, "time series augmentation toolkit", 2 pgs. Retrieved on Mar. 31, 2021 from the Internet URL: <https://github.com/RainBoltz/time-series-augmentation-toolkit/blob/master/time_series_augmentation_toolkit.py>.

KDD-OpenSource, "agots", 4 pgs. Retrieved on Mar. 31, 2021 from the Internet URL: <https://github.com/KDD-OpenSource/agots>.

Mell, Peter, et al., "The NIST Definition of Cloud Computing", NIST Special Publication 800-145, Sep. 2011, Gaithersburg, MD, 7 pgs.

* cited by examiner

Testing Report     MODELS XX,XX,XX,XX,XX,XX,XX,XX,XX,XX

Summary:
1. 10 Models are tested
2. Two of them may have issues because all the predictions are less then the hold out values.

Detailed information:
1.    Model A produce the constant prediction
2.    Model B produce the residuals that are constant positive

INTERACTIVE MACHINE LEARNING OPTIMIZATION

BACKGROUND

Embodiments herein relate generally to the field of machine learning, and more particularly to interactive machine learning optimization.

Many information handling systems include a graphical user interface (GUI) with which a user communicates with the system. A GUI includes the use of graphic symbols or pictures, rather than just words, to represent objects or elements in the system. Program code is associated with a graphic symbol in order to allow the graphic symbol to possess certain desired behaviors. A graphic symbol, along with its associated program code, make up a GUI control element.

Programs that include a GUI typically render on a display screen many graphics including graphical symbols, which can be utilized by a user to communicate with the program and/or control events in the system. To obtain the necessary user input, the program may render a selection graphical symbol on the screen. The user can make an appropriate selection by touching in the case of a touch sensitive GUI and/or with use of a pointer controller.

Data structures have been employed for improving the operation of computer systems. A data structure refers to an organization of data in a computer environment for improved computer system operation. Data structure types include containers, lists, stacks, queues, tables, and graphs. Data structures have been employed for improved computer system operation, e.g., in terms of algorithm efficiency, memory usage efficiency, maintainability, and reliability.

Artificial intelligence (AI) refers to intelligence exhibited by machines. AI research includes search and mathematical optimization, neural networks, and probability. AI solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining an enterprise dataset, the enterprise dataset defined by enterprise collected data; selecting one or more synthetic dataset in dependence on the examining, the one or more synthetic dataset including data other than data collected by the enterprise; training a set of predictive models using data of the one or more synthetic dataset to provide a set of trained predictive models; testing the set of trained predictive models with use of holdout data of the one or more synthetic dataset; and presenting prompting data on a displayed user interface of a developer user in dependence on result data resulting from the testing, the prompting data prompting the developer user to direct action with respect to one or more model of the set of predictive models.

In another aspect, a computer program product can be provided. The computer program product can include a computer readable storage medium readable by one or more processing circuit and storing instructions for execution by one or more processor for performing a method. The method can include, for example: examining an enterprise dataset, the enterprise dataset defined by enterprise collected data; selecting one or more synthetic dataset in dependence on the examining, the one or more synthetic dataset including data other than data collected by the enterprise; training a set of predictive models using data of the one or more synthetic dataset to provide a set of trained predictive models; testing the set of trained predictive models with use of holdout data of the one or more synthetic dataset; and presenting prompting data on a displayed user interface of a developer user in dependence on result data resulting from the testing, the prompting data prompting the developer user to direct action with respect to one or more model of the set of predictive models.

In a further aspect, a system can be provided. The system can include, for example a memory. In addition, the system can include one or more processor in communication with the memory. Further, the system can include program instructions executable by the one or more processor via the memory to perform a method. The method can include, for example: examining an enterprise dataset, the enterprise dataset defined by enterprise collected data; selecting one or more synthetic dataset in dependence on the examining, the one or more synthetic dataset including data other than data collected by the enterprise; training a set of predictive models using data of the one or more synthetic dataset to provide a set of trained predictive models; testing the set of trained predictive models with use of holdout data of the one or more synthetic dataset; and presenting prompting data on a displayed user interface of a developer user in dependence on result data resulting from the testing, the prompting data prompting the developer user to direct action with respect to one or more model of the set of predictive models.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
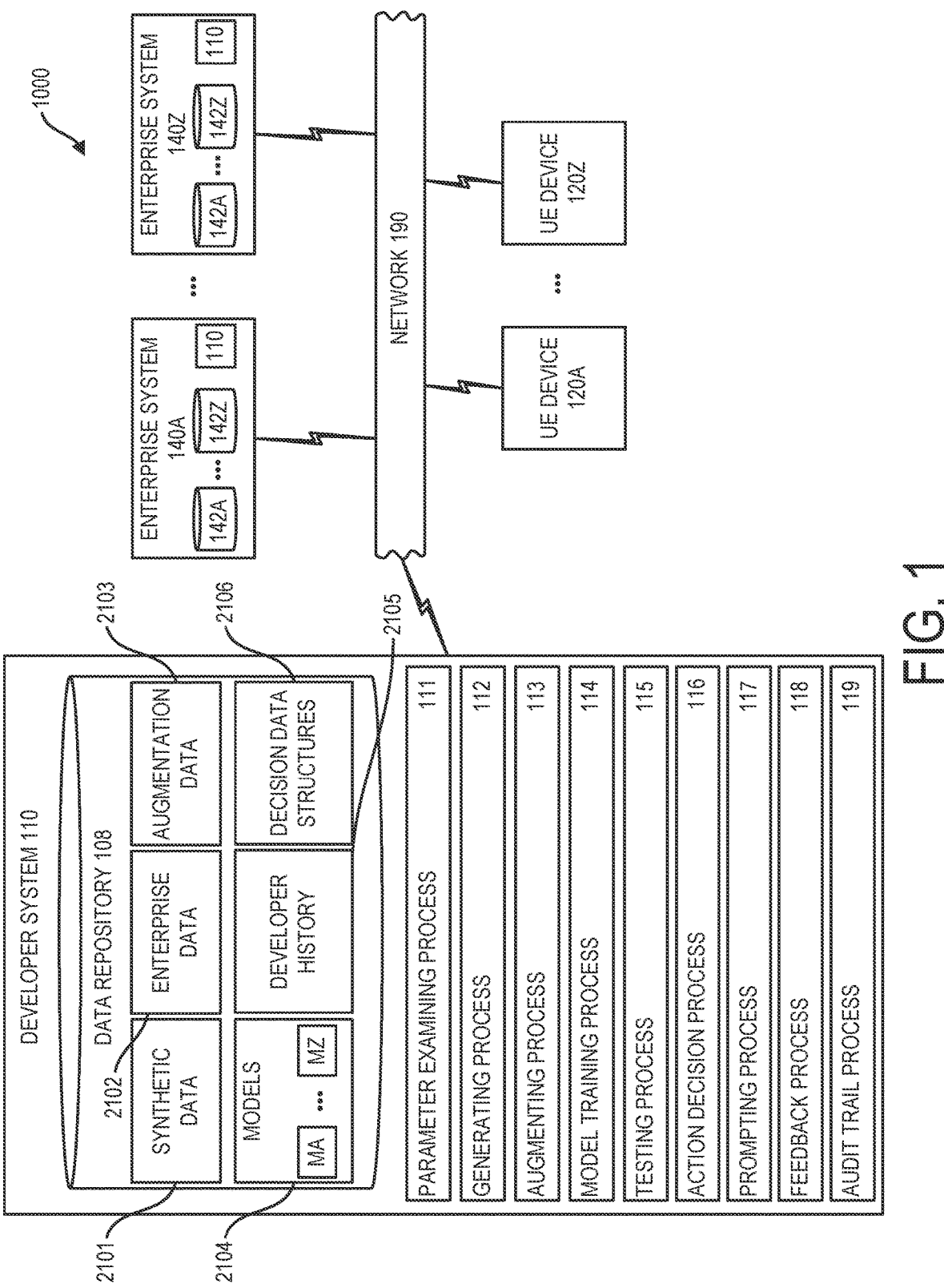
FIG. 1 depicts a system having a developer system, client UE devices, and enterprise systems according to one embodiment.

System 1000 for use in performance of machine teaming can include developer system 110, a plurality of user equipment (UE) devices 120A-120Z, and enterprise systems 140A-140Z. Developer system 110, UE devices 120A-120Z, and enterprise systems 140A-140Z can be in communication with one another via network 190. System 1000 can include numerous devices that can be computing node based devices connected by network 190. Network 190 can be a physical network and/or a virtual network. A physical network can, for example, include physical telecommunications network connecting numerous computing nodes or systems such as computer servers and computer clients. A virtual network can for example, combine numerous physical networks or parts thereof into a logical virtual network. In another example, numerous virtual networks can be defined over a single physical network. In another example, numerous virtual networks can be defined over a single physical network.

In one embodiment, developer system 110 can be external to UE devices 120A-120Z, enterprise systems 140A-140Z. In one embodiment, developer system 110 can be co-located with one or more of UE devices 120A-120Z and/or enterprise systems 140A-140Z.

Embodiments herein recognize that difficulties are encountered in selecting predictive models for predicting events such as time series events. Model selection processes can yield extensive lead times and poor performance. Sometimes, problems with models may be observed only after a model has been deployed in a running application, leading to downtimes in a software service. Embodiments herein recognize that if a predictive model running within an enterprise application is not well functioning, an application may require termination to permit upgrading to a new model.

Embodiments herein can include features for facilitating guided selecting for deployment of well performing predictive models for predicting events including time series events subject to data collection by an enterprise, e.g., computing resources related events, events occurring in commerce, monitored industrial events, monitored medical events, monitored naturally occurring events, and the like. Examples of events that might be predicted using trained predictive models can include, e.g., computing resource utilization (e.g., CPU and/or storage), sales, inventory, investments, IoT monitored events, industrial facility monitored events, medical reading (e.g., blood pressure) monitored events, naturally occurring monitored events, and the like all of which can be subject to data collection by an enterprise. Embodiments herein can include, e.g., features for selecting training data for use in training predictive models, features for generating synthetic datasets, features for selection of models for testing, features for selection of datasets for next iterations of training and testing of models, features for testing models, features for action decisions to present prompting data, and additional features for the selection of predictive models for deployment in an application such as in an enterprise application.

Embodiments herein provide for rapid selection of well performing models. With minimal iterations of training and testing, one or more well performing model can be selected for deployment in an enterprise application. Embodiments herein recognize that training models with training data in some instances can consume significant time, and training a model with an extensively large dataset or with numerous datasets may not be practical or possible. Embodiments herein permit intelligent and systematic user interface guided selection of datasets for model provisioning, so that total training time and development time is limited.

Embodiments herein can employ synthetic data for model testing. Embodiments herein recognize that testing models using of synthetic data can reveal properties of the model not revealed with use of enterprise data. Embodiments herein recognize that one reason that use of synthetic data can reveal properties not revealed with use of enterprise data is that synthetic data can assume parameter values not observed within historical enterprise data, but which may be observed within future enterprise data. Embodiments herein recognize that data other than enterprise data, i.e., synthetic data, can be useful in training and testing of predictive models for use by an enterprise. For example, testing trained predictive models with synthetic datasets can identify models that can successfully respond to new data having unforeseen or unforeseeable attributes that are currently unforeseen by an enterprise. Accordingly, embodiments herein with use of guided user interface features can facilitate improved selection of well performing models for deployment.

With further reference to FIG. 1, developer system 110 can include data repository 108 in which various data can be stored. In synthetic data area 2101, data repository 108 can store synthetic training data. The synthetic data can be defined by time series data. Synthetic data stored in synthetic data area 2101 can include time series synthetic datasets. Synthetic data can include data other than enterprise collected data including data, e.g., from fictitious events, simulated events, textbook data, manually created data, other data not collected by an enterprise, and the like. Within synthetic data area 2101, there can be associated to respective synthetic datasets an associated dataset ID for the dataset, as well as a set of extracted parameter values that characterizes respective ones of the synthetic datasets. Developer system 110 can be configured to iteratively, e.g., on a periodic basis, perform processing of synthetic datasets of synthetic data area 2101 for extraction of sets of synthetic dataset characterizing parameter values. Processing of synthetic datasets for extraction of synthetic dataset characterizing parameter values can include, e.g., spectral analysis, periodogram analysis, and/or Fourier analysis. Extracted dataset characterizing parameter values can include extracted dataset characterizing parameter values of, e.g., periodicity, seasonality, trend, length, granularity, autocorrelation, wavelength, covariance, and topic (domain).

Accordingly, for each dataset stored in synthetic data area 2101, data repository 108 can store a set of extracted dataset characterizing parameter values. The set of extracted dataset characterizing parameter values can be extracted by processing each respective synthetic dataset. In synthetic data area 2101, data repository 108 can, in addition, store the classifier for the dataset. Respective datasets can be classified in accordance with threshold exceeding parameter values of the dataset. That is, if a dataset has a "trend" parameter value satisfying a threshold, the dataset can be labeled with a "trend" classification. If a dataset has a "seasonality" parameter value satisfying a threshold, the dataset can be labeled with a "seasonality" classification. Possible classifiers of datasets can include, e.g., the trend classification, the seasonality classification, the outlier classification, and the level shift classification. The classifications can indicate a prominent feature of the dataset, as may be indicated by a parameter value satisfying a threshold. Developer system 110 can perform natural language processing on text-based data of a dataset for extraction of a topic (domain) parameter value associated to a dataset. Developer system 110, for return of a topic classification of a synthetic dataset, can additionally or alternatively subject to natural language processing input descriptive text input into a user interface by a developer user describing a synthetic dataset and/or documents associated to a synthetic dataset.

Data repository 108 in enterprise data area 2102 can store enterprise data. The enterprise data can be defined by time series datasets. Example enterprise datasets that can be stored in enterprise data area 2102 can include datasets respecting, e.g., computing resource utilization (e.g., CPU and/or storage), sales, inventory, investments, IoT monitored events, industrial facility monitored events, medical reading (e.g., blood pressure) monitored events, naturally occurring monitored events, and the like all of which can be subject to data collection by an enterprise. Enterprise data can include actually observed data collected by an enterprise and received from enterprise system of enterprise systems 140A-140Z. Enterprise data area 2102 can include enterprise datasets. Respective enterprise data datasets can have an associated dataset ID and one or more associated topic. From time to time, e.g., periodically or in batch, enterprise systems 140A-140Z can push enterprise dataset data into enterprise data area 2102. Enterprise data can include data collected by an enterprise and synthetic data can include data other than data collected by an enterprise. Datasets of synthetic data area 2101 and enterprise data area 2102 can be used for provisioning predictive models that are subject to training and testing.

Data repository 108 in augmentation data area 2103 can store, e.g., tools and libraries for the augmentation of training datasets for use by developer system 110. Developer system 110, using data from augmentation data area 2103, can apply augmentations, e.g., noise, jitter, outlier, drift, quantization, convolution, variance, to existing datasets for the generation of new synthetic datasets.

Data repository 108 in models area 2104 can store models for testing and training by developer system 110, which models can be deployed by respective enterprise systems 140A-140Z. Respective models of models area 2104 can have associated model operation classifications that describe operation of a model. Classifications for models in models area 2104 can include, e.g., neural network (NN), support vector machine (SVM), linear regression, Holt-Winter, ARIMA, random forest, and others. Models area 2104 in one embodiment can store multiple models of a given classification, e.g., NN1-NNZ, SVM1-SVMZ, and so on.

Data repository 108 in developer history area 2105 can store history data specifying actions of developer users in the performance of historical sessions involving developer system 110. Developer history area 2105 can store data specifying historical developer user actions of a current developer user associated to a current instance of developer system 110 as well as data specifying historical developer user actions of other developer users associated to other instances of developer system 110, such as instances that have been deployed in respective enterprise systems 140A-140Z.

Decision data structures area 2106 can store decision data structures for return of action decisions. Decision data structures area 2106 can include, e.g., decision tables and decision trees.

Developer system 110 can run various processes. Developer system 110 running parameter examination process 111 can examine enterprise data of an enterprise in order to extract enterprise dataset characterizing parameter values therefrom, and then can compare the extracted enterprise dataset characterizing parameter values to synthetic dataset characterizing parameter values of synthetic data area 2101. Developer system 110 running parameter examination process 111, based on a comparing of enterprise dataset characterizing parameter values to synthetic dataset characterizing parameter values, can select one or more synthetic dataset from synthetic data area 2101 for application to a set of models for training and testing. Extracted dataset characterizing parameter values can include extracted dataset characterizing parameter values of, e.g., periodicity, seasonality, trend, length, granularity, autocorrelation, wavelength, covariance, and topic (domain).

For extraction of dataset characterizing parameter values from an enterprise dataset, developer system 110 running parameter examination process 111 can apply, e.g., spectral analysis, periodogram analysis, and/or Fourier analysis. Developer system 110 miming parameter examination process 111 can include developer system 110 examining sets of synthetic dataset characterizing parameter values that have been extracted from synthetic datasets of synthetic data area 2101 using, e.g., spectral analysis, periodogram analysis, and Fourier analysis.

Developer system 110 running parameter examination process 111 can select a synthetic dataset based on comparing of extracted enterprise dataset characterizing parameter values to multiple sets of extracted synthetic dataset characterizing parameter values. Developer system 110 running parameter examination process 111 can score each synthetic dataset of synthetic data area 2101 by aggregating (e.g., summing) the differences between parameter values of common parameters between an enterprise dataset characterizing set of parameter values and a synthetic dataset characterizing set of parameter values to provide an ordered list of ranked synthetic datasets ranked in order of similarity to an enterprise dataset. Extracted dataset characterizing parameter values of an enterprise dataset and synthetic datasets subject to comparison can include extracted dataset characterizing parameter values of, e.g., periodicity, seasonality, trend, length, granularity, autocorrelation, wavelength, covariance, and topic (domain). Developer system 110 for extraction of a topic from a dataset can subject y axis text-based labels of a dataset to natural language processing. Developer system 110 running parameter examination process 111 for topic extraction can additionally or alternatively examine input descriptive text input by a developer user and/or text based business documents of an enterprise associated to an enterprise dataset, e.g., involving business plans and reports, project mission documents, and the like.

Developer system 110 running generating process 112 can generate synthetic datasets based on one or more enterprise dataset characterizing parameter value of a set of enterprise dataset characterizing parameter values. Embodiments herein recognize that in some instances a synthetic dataset from synthetic data area 2101 cannot be selected from synthetic data area 2101 based on an applied criterion (e.g., a synthetic dataset having a threshold level of similarity with an enterprise dataset not identified). In such instances, developer system 110 can generate a synthetic dataset using synthetic parameter values generated in dependence on enterprise dataset characterizing parameter values extracted from enterprise data. In some scenarios, developer system 110 running generating process 112 can include developer system 110 running augmenting process 113.

Developer system 110 running augmenting process 113 can augment a dataset for use in provisioning a model subject to testing and training Developer system 110 running augmenting process 113 can, e.g., apply noise or other perturbations to training data selected for training of a model. Applied augmentations can include, e.g., noise, jitter, outlier, drift, quantization, convolution, variance.

Developer system 110 running model training process 114 can subject a set of predictive models to training. Developer system 110 running model training process 114 can apply training data to a set of models comprising at least one model for training of the set of models. Developer system 110 miming model training process 114 can parse holdout data from a provisioning dataset for use in testing of performance of model after it has been trained. Developer system 110 running model training process 114 can include developer system 110 applying data of one or more synthetic dataset for training a set models comprising one or more model. The one or more dataset for training can include a respective dataset classifications. Dataset classifications can include, e.g., trend, seasonality, outlier, and level shift. A dataset's classification can refer to a prominent feature of a dataset.

Developer system 110 running testing process 115 can test a set of trained models after training of the set of models comprising one or more model. Developer system 110 running testing process 115 can compare predicted output values output by a trained model to ground truth data defined by holdout data of dataset selected for use in training. Developer system 110 running testing process 115 can include developer system 110 examining result data of a plurality of different models on being trained with use of one or more dataset. Developer system 110 miming testing process 115 can produce reporting data that reports performance of trained models in reference to ground truth data defined by holdout data of a training dataset.

Developer system 110 running action decision process 116 can return action decisions based on examined data. Developer system 110 running action decision process 116 can return action decisions based on result data defined by model test result data. Developer system 110 running action decision process 116 can utilize one or more decision data structure stored in decision data structures area 2106. Developer system 110 running action decision process 116 can return action decision that specify presentment of prompting data to a developer user, such as prompting data that prioritizes a first synthetic dataset over a second synthetic dataset for use in a next iteration of training and testing of a predictive model. Developer system 110 running action decision process 116 can return action decision that specify presentment of prompting data to a developer user, such as prompting data that prioritizes and preferentially prompts for selection of a first synthetic dataset over a second synthetic dataset for use in a next iteration of training and testing of a predictive model.

Developer system 110 running prompting process 117 can present prompting data to the developer user, e.g., on a displayed user interface, prompting the user to perform an action. Prompting data can be presented in accordance with an action returned by running of action decision process 116. Developer system 110 running prompting process 117 can, e.g., present prompting data that prompts the user to select the certain dataset from synthetic data area 2101 or enterprise data area 2102 for use in training one or more model. Prompting data presented by prompting process 117 can include prompting data that prompts for the selection of model provisioning dataset such as a model provisioning synthetic dataset for use in training and testing predictive model.

Developer system 110 running prompting process 117 can include developer system 110 presenting prompting data for prompting selection of a certain one or more model for deployment in an enterprise system application. Developer system 110 running prompting process 117 can perform prompting to provide an action that is specified by action decision process 116. In some instances, developer system 110 can be configured so that certain data is restricted from being presented as prompting data. In dependence on tests results resulting from testing a trained predictive model, developer system 110 can intelligently exclude certain datasets from a test, thereby guiding a developer user and rendering training and testing for model selection more streamlined. Developer system 110 running prompting process 117 can prompt a developer user to select a next dataset based on a mapping for a certain model between a most recently applied training dataset and result data associated to the most recently applied training dataset. In some instances, developer system 110 can be configured so that certain data is presented with lower priority than particular data.

Developer system 110 running feedback process 118 can include developer system 110 monitoring feedback inputs of developer user using such inputs for return of action decision by action decision process 116.

Developer system 110 running audit trail process 119 can generate an audit trail of actions performed by developer user in the performance of actions, e.g., to select training datasets for application to models for training and testing, and models for deployment. Audit trail history data can be stored in developer history area 2105. Developer system 110 can use developer history data of developer history area 2105 for the return of action decisions by action decision process 116, e.g., in making recommendations by the presentment of prompting data for prompting selection of certain what?, e.g., of a training dataset, a certain augmentation of a training dataset, selection of a model for training and testing, selection of a set of models comprising one or more model for deployment, and the like.

Enterprise systems 140A-140Z can respectively include a plurality of databases 142A-142Z. Databases 142A-142Z can store various enterprise data. Enterprise data can include real world, actually occurring, event data of interest to particular enterprise. Enterprise data defined by datasets such as time series datasets can include data collected by an enterprise, such as data of computing resource utilization (e.g., CPU and/or storage), sales, inventory, financial investments, IoT device monitoring, medical (e.g., blood pressure) monitoring, industrial facility monitoring, and the like all of which can be subject to data collection by an enterprise. Embodiments herein recognize that in selection of models for deployment in an enterprise application development can be performed, e.g., by an agent developer user of the enterprise, by an agent developer user of an enterprise specializing in software development, or by an enterprise agent developer user collaborating with the developer user of the development specializing enterprise. Accordingly, different alternative deployment and usage scenarios for development of software using developer system 110 are described with reference to FIG. 1. Enterprise systems 140A-140Z can respectively include instances of developer system 110.

UE devices 120A-120Z as shown in FIG. 1 can refer to UE devices of developer users such as developer users of an entity associated to developer system 110, and/or developer users associated to respective ones of enterprise systems 140A-140Z.

A method for performance by developer system 110 interoperating with enterprise system 140A and UE device 110A is described in connection with FIG. 2. At block 1401 enterprise system 140A can be sending enterprise data defined by enterprise time series dataset data for receipt by developer system 110. In response to the receipt of the enterprise data, developer system 110 at block 1001 can send the enterprise data for storage into data repository 108 which can receive and store the enterprise data at block 1081. Based on the received enterprise data, developer system 110 can proceed to block 1002 to perform examining of enterprise data.

Figure 3:
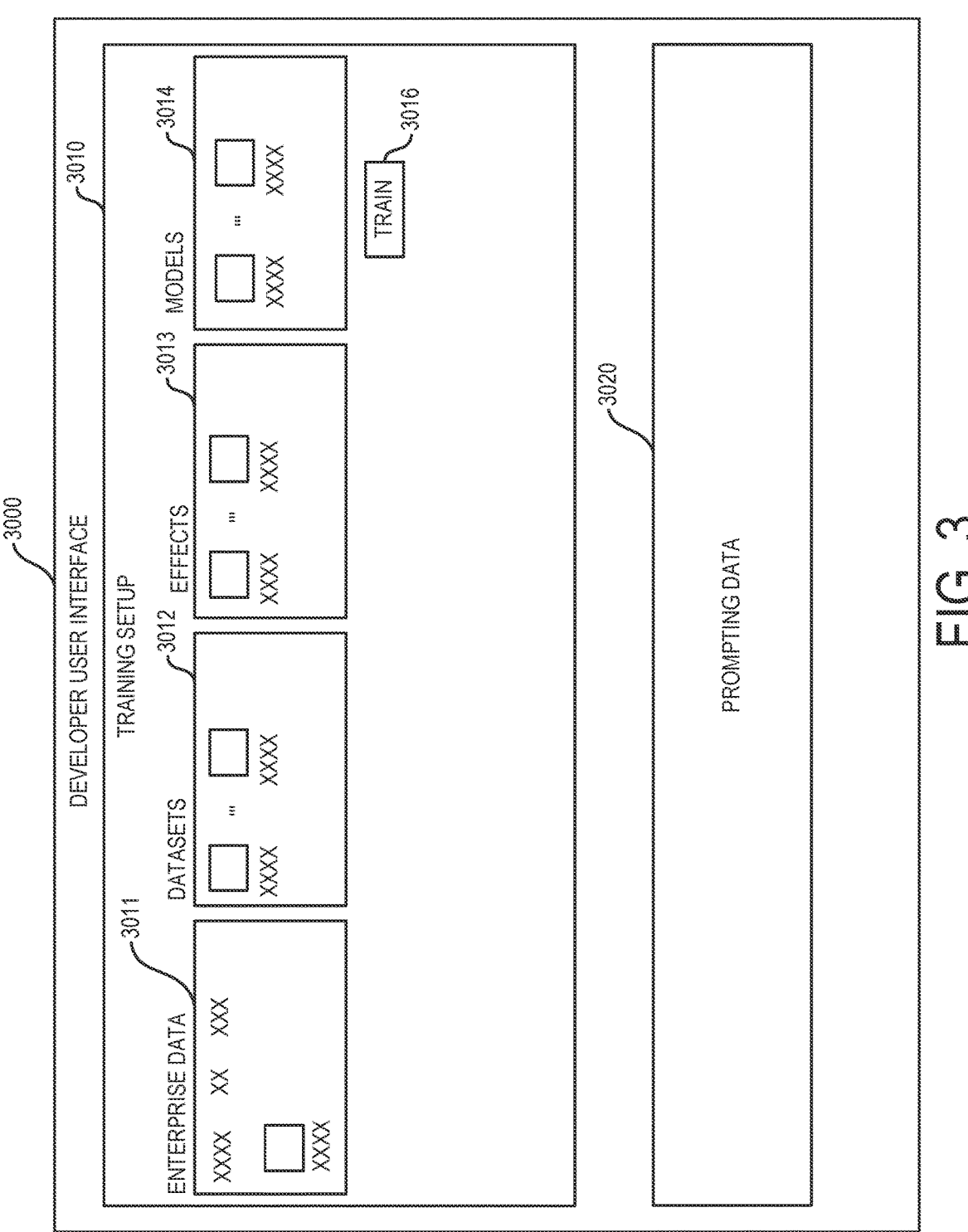
FIG. 3 depicts a user interface for display on a developer user UE device according to one embodiment.
Figure 4A:
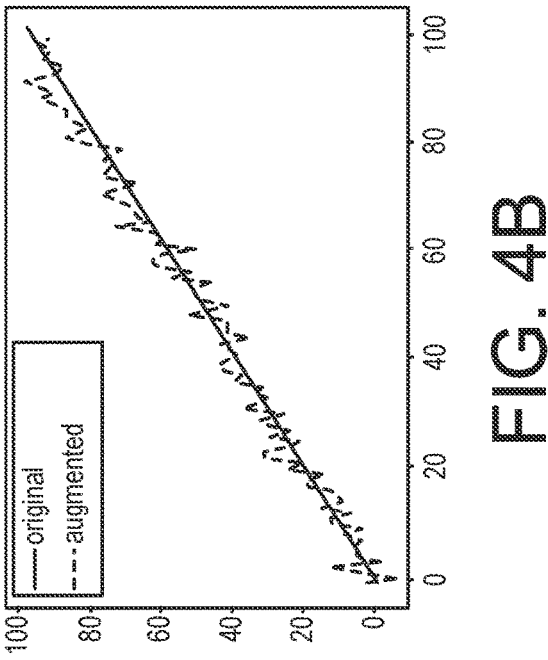
FIG. 4A-4D depict augmentations that can be applied to datasets according to one embodiment.
Figure 4B:
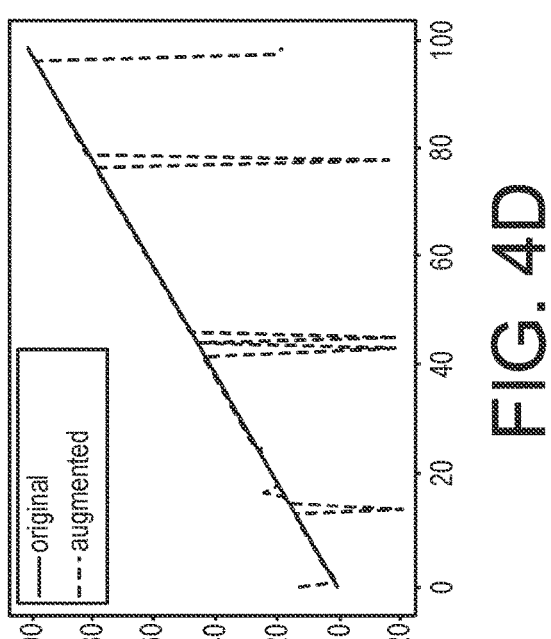
Figure 4C:
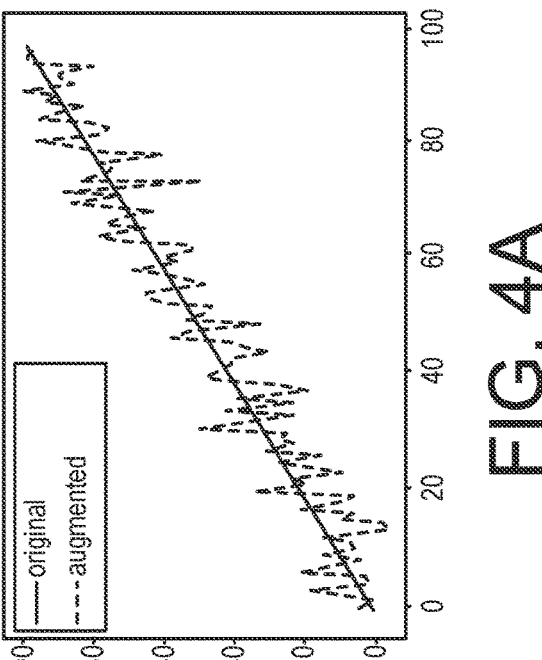
Figure 4D:
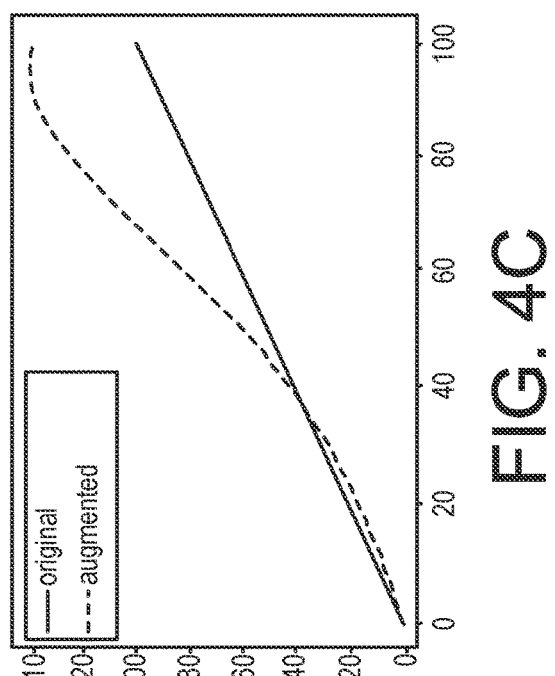

In FIG. 3, there is depicted a user interface 3000 defining a dashboard for use by developer user. User interface 3000 can be a displayed user interface displayed on a display of a UE device 120A-120Z. User interface 3000 can include, e.g., a training setup area 3010 and a prompting area 3020. Prompting data can be presented in training setup area 3010 and/or prompting area 3020. Training setup area 3010 can include enterprise data area 3011, datasets area 3012, effects area 3013, and models area 3014. In enterprise data area 3011, a developer user can indicate the enterprise data for which model data will be generated using developer system 110.

In enterprise data area 3011 of training setup area 3010 of user interface 3000, a developer user can specify enterprise data of an enterprise to be subject to modeling. In enterprise data area 3011, a developer user can drag and drop icons associated to files such as enterprise dataset files defined by collected data that has been collected by an enterprise which the enterprise is desirous of modelling. A developer user can click on the icons to obtain addition information about the datasets indicated enterprise data area 3011, including visualizations of the same. In enterprise data area 3011, a developer user can also enter text-based description describing the topic (domain) of the enterprise data to be modeled. In enterprise data area 3011, a developer user can also drag and drop non-dataset text-based files, such as enterprise business planning documents and the like. The input files and text description input into enterprise data area 3011 can be processed by natural language processing for extraction of topics from the input files. In one scenario, the developer user can enter unstructured text into enterprise data area 3011 and the unstructured can be subject to natural language processing (NLP) by developer system 110 for extraction of topics by developer system 110.

In datasets area 3012, user interface 3000 can present indicators, e.g., icons associated to various datasets that can be used as training and testing data by developer user. The datasets can be datasets of synthetic data area 2101 and/or enterprise data area 2102. A developer user can click on the icons to obtain additional information about the datasets indicated in datasets area 3012, including visualizations of the same. The visualization can include graphical visualization of time series data as indicated, e.g., in FIGS. 4A-4D and FIGS. 7-9 herein.

In effects area 3013, user interface 3000 can present icons associated to various augmentations that can be used to modify training and datasets, e.g., noise, jitter, outlier, drift, quantization, convolution, variance. User interface 3000 can be configured so that user can drag and drop an augmentation icon of effects area 3013 onto a dataset icon of datasets area 3012 to initiate generation of a new synthetic dataset for storage into synthetic data area 2101.

In models area 3014, user interface 3000 can present, e.g., icons mapping to models that can be subject to training and testing to define a set of M models for training and testing. User interface 3000 can be configured so that a developer user can click on a model icon to view attribute parameter values associated to respective models. The attribute parameter values can include, e.g., values of such parameters as model classification (e.g., neural network (NN), support vector machine (SVM), linear regression, Holt-Winter, ARIMA, random forest, etc.) as well as other attribute parameter values of parameters that define, e.g., rules, constraints, transfer functions, and the like.

Returning to FIG. 2, at examining block 1002, developer system 110 can run parameter examining process 111. At block 1002, developer system 110 can subject a time series dataset of an enterprise to parameter extraction for extraction of dataset characterizing set of parameter values. The dataset characterizing parameter values can include extracted dataset characterizing parameter values of, e.g., periodicity, seasonality, trend, length, granularity, autocorrelation, wavelength, covariance, and topic (domain) which can be extracted from a dataset using natural language processing. At block 1002, developer system 110 running parameter examining process 111, as explained with reference to FIG. 1, can compare extracted enterprise dataset characterizing parameter values to extracted synthetic dataset characterizing parameter values characterizing synthetic datasets of synthetic data area 2101.

At examining block 1002, developer system 110 running parameter examination process 111, as explained with reference to parameter examining process 111 of FIG. 1, can generate an ordered list of ranked synthetic datasets ranked in order of similarity to an enterprise dataset subject to processing at block 1002. Based on the ordered list, developer system 100 can select one or more synthetic dataset for use in training and testing predictive models. For activating examining block 1002, a developer user can activate train button 3016 once the developer user has been satisfied that adequate data specifying targeted enterprise data to be modeled has been entered into enterprise data area 3011. The training and testing dataset(s) selected for training and testing at block 1005 can depend on the enterprise data entered into enterprise data area 2102 describing and specifying the enterprise data to be modeled.

In response to the examining at block 1002, developer system 110 at selecting block 1003 can select one or more synthetic dataset from synthetic data area 2101 for use in training a set of predictive models M comprising one or more model. The set of predictive models M in one embodiment can be predetermined, and, in one embodiment, user interface 3000 can facilitate user selection of the set of predictive models M subject to training and testing, e.g., by activation of select icons displayed within models area 3014. According to one embodiment, the selecting at block 1003 can include selecting the highest ranked synthetic datasets that has been ranked in order of similarity to the enterprise dataset specified by a developer user using area 3011. According to one embodiment, the selecting at block 1003 can include selecting the highest N (N≥1) ranked synthetic datasets that have been ranked in order of similarity to the enterprise dataset. The value N, in one embodiment, can be predetermined and in one embodiment user interface 3000 can facilitate user selection of the value N, e.g., using a dataset count indicator within dataset area 3012. While selecting multiple datasets for training can provide advantages, it can be advantageous in some scenarios to select a single dataset for training each of a set of predictive models M in an initial training iteration. The single selected training dataset can be a dataset having threshold satisfying similarity with the enterprise dataset subject to examining at block 1001. In one embodiment, developer system 110 can select the most similar synthetic dataset stored in synthetic data area 2101 as the synthetic dataset having threshold satisfying similarity with an enterprise datasets subject to examining at block 1001. Training on the described single dataset avoids problems with tracking detected deficiencies of models to particular datasets, and provides for fast training and testing.

In some scenarios, data repository 108 can have an insufficient number (e.g., less than N) of synthetic datasets that have threshold satisfying similarity with an enterprise dataset. In such a scenario, developer system 110, at conditional generating block 1004, can perform generating one or more new synthetic datasets so that a total of N datasets are selected for provisioning predictive models. For generating a synthetic dataset featuring a threshold satisfying similarity to an enterprise dataset at block 1004, developer system 110 running generating process 112 can (a) examine the extracted set of dataset characterizing parameter values characterizing the enterprises dataset extracted at block 1002, (b) change values of the extracted parameter values to return changed parameter values that are changed and yet feature the threshold satisfying similarity to the enterprise dataset, and (c) produce a synthetic dataset featuring the changed parameter values. For generating a synthetic dataset featuring a threshold satisfying similarity to an enterprise dataset at block 1004, developer system 110 running generating process 112 can in some scenarios run augmenting process 113 to augment an existing dataset of synthetic data area 2101 or enterprise data area 2102 to provide a new synthetic dataset that features an augmentation such as an augmentation that includes, e.g., noise, jitter, outlier, drift, quantization, convolution, and/or variance. FIGS. 4A-4D illustrate, respectively, noise, jitter, drift, and outlier augmentations that can be applied to a dataset for the providing of a new synthetic dataset. The examining at block 1002 can include multiple data queries on data repository 108 as indicated by receive and respond block 1082 performed by data repository 108.

Embodiments herein recognize that training and testing predictive models using synthetic datasets that are similar, but not identical, to an enterprise dataset can be useful in identifying potential problems with a modeled application of an enterprise. Use of synthetic datasets can reveal properties and performance boundaries of models not revealed with use of enterprise datasets for training.

Responsively to completion of block 1004, developer system 110 can proceed to block 1005. At block 1005, developer system 110 can perform training and testing of a set of M models with use of the N selected datasets selected at block 1003 and (conditionally) at block 1004. The set of M models can include one or more model. According to one embodiment, during an initial pass through block 1004, developer system 110 can subject a comprehensive set of models M to testing and training, e.g., several tens of models (e.g. ~100), with a plurality of models according to each of the noted general classifications, neural network (NN), support vector machine (SVM), linear regression, Holt-Winter, ARIMA, random forest, and others.

At training and testing block 1005, developer system 110 can divide a model provisioning dataset into training data and holdout data. Developer system 100 can train the set of M predictive models using the training data and can test the models using the holdout data once trained. Multiple types of tests can be performed. At block 1005, developer system 110 can perform training and testing of the set of M predictive models. The set of M predictive models can include predictive models in multiple classifications, e.g., neural network (NN), support vector machine (SVM), linear regression, Holt-Winter, ARIMA, random forest, and others.

For training and testing the set of M predictive models, developer system 110 at block 1005 can divide provisioning data into testing data and into training data and holdback data, e.g., on a percentage basis such as 80 percent training data and 20 percent holdback data. For testing of each respective predictive model, developer system 110 can compare output values output by a trained predictive model trained with the training data to ground truth data defined by the holdback data. The performance of block 1005 can include multiple data queries on data repository 108 as indicated by receive and respond block 1083 performed by data repository 108.

Examples of tests applied by developer system running testing process 115 at block 1005 can include, e.g., (a) a constant prediction test to determine whether the trained model provides a constant prediction. The constant prediction test can analyze whether a time series model always produces constant forecast. In other words, the model may be too simple and only use the mean of data to forecast; (b) a constant under or over prediction test to determine whether the trained model provides a constant underprediction (or overprediction). The constant under or over prediction test can analyze whether a time series model can handle level shift in time series data. In other words, if a time series data has level shift and a time series can capture the shift, then the residual should be randomness. Accordingly, when all forecast values are under the observed values, a problem can be flagged; (c) a finite under or over prediction test to determine whether the trained model provides a finite underprediction (or overprediction). The finite under or over prediction test can analyze whether a time series can handle the outlier patch, i.e., where the data has several consecutive outliers. In other words, if a time series model can handle the outlier patch, the residual should be randomness, otherwise, there will be finite underprediction (or overprediction); (d) a residual trend test to determine whether the trained model provides a trend residual. The residual trend test can analyze whether the residual has trend pattern. In other words, if a time series model is performing well, then the residual should be randomness. On the other hand, if there is trend pattern in residual, a problem is flagged in the model; and (e) a variance change pattern test to determine whether the trained model provides a variance change pattern in residuals. The variance change pattern test can analyze whether a time series model can capture variance change in time series model. In other words, if a time series can handle variance change in time series data, then the residual should be randomness. If there is variance change pattern in the residual, a performance deficiency with a predictive model has been flagged.

On completion of training and testing block 1005, developer system 110 can proceed to block 1006. At block 1006, developer system 110 can run action decision process 116 to return an action decision. The action decision can be an action decision to present prompting data to prompt a developer user to take action. According to one embodiment, the action decision can be an action decision in dependence on result data from the testing at block 1005. A small sample of action decisions that can be applied at block 1006 for the generation of prompting data are summarized in Table A.

TABLE A

| Row | Condition 1 | Condition 2 | Condition 3 | Action Decision |
|---|---|---|---|---|
| 1 | Test results showed that the trained model will not change when subject to training with dataset having trend classification A | Dataset having trend classification A was previously applied as training data | | Exclude all datasets having trend classification A from subsequent iteration |
| 2 | Dataset with classification B used for training and testing of model | Test result data specifies result I | | Prioritize prompting for dataset classification M |
| 3 | Dataset with classification B used for training and testing of model | Test result data specifies result II | | Prioritize prompting for dataset classification N |
| 4 | Dataset with classification C used for training and testing of model | Test result data specifies result III | | Prioritize prompting for dataset classification P |
| 5 | Dataset with classification D used for training and testing of model | Test result data specifies result IV | Prioritized dataset classification not found for classification D-result IV mapping | Prioritize prompting for dataset having threshold satisfying dissimilarity with dataset classification C |
| 6 | Dataset with trend pattern is used for model testing | Tests results showed that the residual still has trend | | 1. Pop up the message: "the model may not be good to capture the trend characteristic" 2. Exclude the trend data from subsequent testing. 3. Select another data that has threshold satisfying dissimilarity with the trend data based on similarity measure |
| 7 | Dataset with level shift pattern is used for model testing | Tests results showed that models can handle level shift pattern well | | 1. Exclude the level shift data from subsequent testing. 2. Select another data that has threshold satisfying dissimilarity with the data with level shift based on similarity measure |
| 8 | Seasonal data is used for model testing | Tests results showed that models cannot handle seasonal pattern well | By statistical testing, the data has seasonal pattern but there is no similar data in the library | 1. Pop up the message: "the model may not be good to capture the seasonal characteristic" 2. Simulate a data which is similar to the seasonal data and store in library 3. Exclude the seasonal data from subsequent testing. 4. Select another data that has threshold satisfying dissimilarity with the seasonal data based on similarity measure |
| 9 | Test results showed that the trained model will not change when subject to training with dataset having trend classification G | Dataset having trend classification G was previously applied as training data | | Relegate datasets having trend classification G from subsequent iteration |

Referring to the decision data structure of Table A, the decision data structure of A can return action decisions to present prompting data prompting for selection of a next dataset for use in training and testing of respective models of a set of M models subject to training and testing at block 1005. A prompted for next dataset can be a dataset stored in synthetic data area 2101 of data repository 108, and a prompted for next dataset can be generated on-demand, e.g., in response to user selection of a prompted for dataset, if currently absent from data repository 108.

Referring to Row 1, developer system 110 in some scenarios, can exclude from recommendation one or more dataset for application in a next iteration of training and testing of a predictive model in dependence on result data from testing the predictive model. Embodiments herein recognize that the exclusion of datasets from being recommended for training and testing can avoid unnecessary processes and lead to the expeditious identification of a working set of one or more predictive model. The exclusion of certain datasets from prompting data can reduce the risk of the developer user selecting a dataset for a next iteration of training that will yield little or no discovery of attributes of a model being subject to training and testing. Presented prompting data associated to the action decision of Row 1 can be restricted from presenting indictors of one or more dataset that is excluded from being recommended.

Referring to Rows 2 to 4, it will be seen that mapping relationships can be established so that when there is a certain classification of a provisioning dataset that yields a particular result a certain next synthetic dataset can be prompted for by developer system 110 for use as a next applied provisioning dataset. Action decisions of Rows 2 to 4 specify prioritization of a certain dataset prioritization of prompting for a certain dataset the prioritization of the certain, the prioritization of prompting for a certain dataset can include displaying specifier for the dataset with a highlight, e.g., different color, larger size, flashing, top height presentment, an additional arrow indicator, and the like. The mapping relationships described in reference to Rows 2 to 4 can be specified by an administrator user based on attributes of predictive models known by the administrator user.

Figure 5:
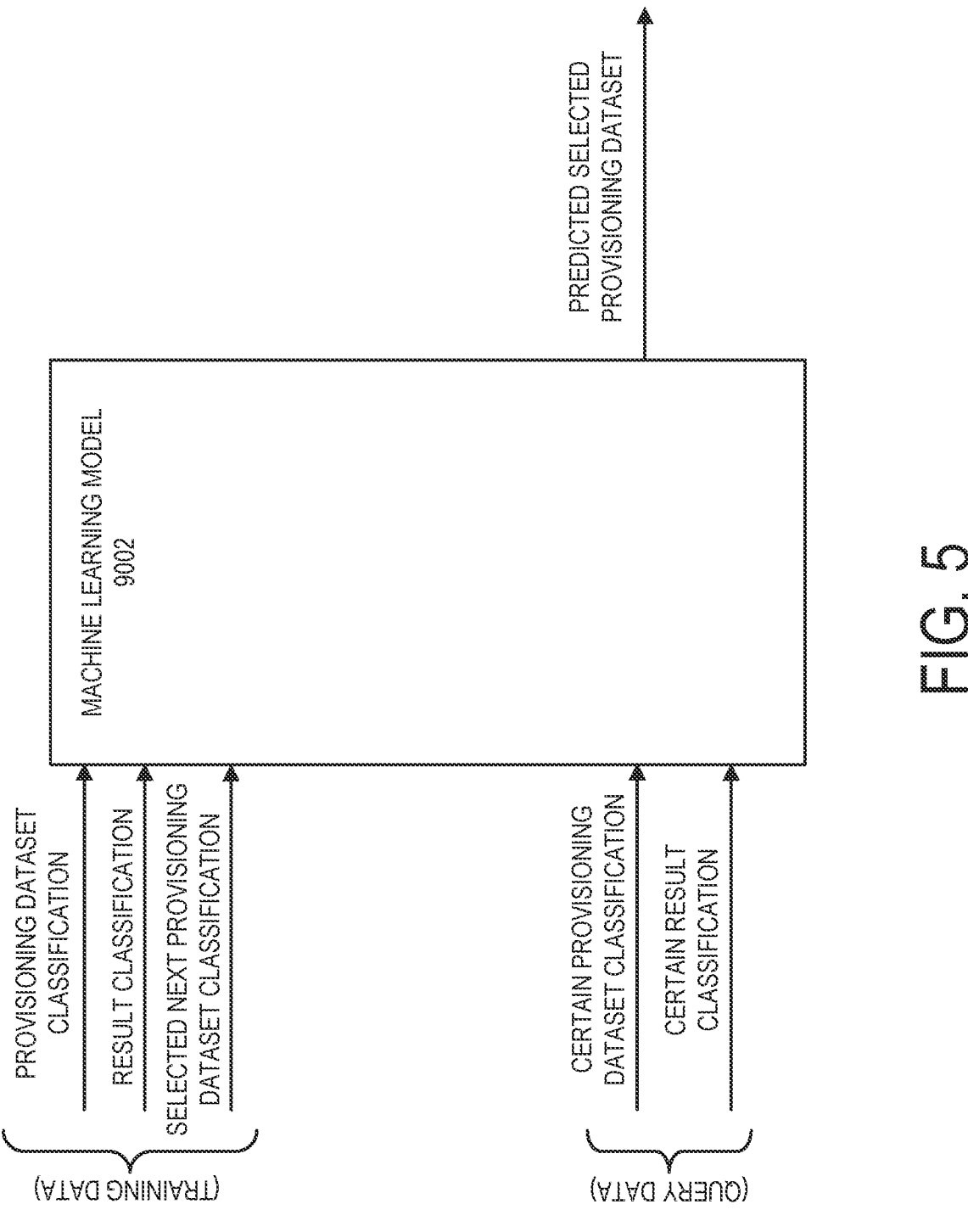
FIG. 5 depicts a machine learning model according to one embodiment.

In another scenario, the mapping relationships described with reference to Rows 2 to 4 can be established using the plurality of instances of machine teaming model 9002 as described with reference to FIG. 5. Machine learning model 9002 can be trained to predict the developer user's next selection of provisioning dataset for use in training and testing of the certain predictive model plurality of instances. Machine learning model 9002 can be provided for each respective model of a model set subject to training and testing at block 1005. Machine learning model 9002 can be trained with use of crowdsourced training data, i.e., data from a plurality of developer users. Embodiments herein recognize that system 1000 can benefit from the know-how and experience of a plurality of developer users who have an understanding and knowledge the functioning of machine learning models.

In one envisioned scenario with reference to FIG. 1, developer history area 2105 can include developer history data of a plurality of developer users, e.g., developer users associated with each system of enterprise systems 140A-140Z. In one embodiment, different enterprises can become subscribers of developer system 110 and based on a subscription can agree to share developer history decisions, and data records of such decisions can be iteratively pushed to developer system 110 for storage into developer history area 2105, e.g., on a periodic basis throughout the deployment period of system 1000.

Machine teaming model 9002 can be trained with multiple iterations of training datasets. Machine learning model 9002, once sufficiently trained with training data, can be operable to render predictions in response to receipt of query data. Training datasets that can be applied to machine learning model 9002 for training machine teaming model 9002 associated to a certain predictive model of the model set M can include: (a) a classifier for an historical provisioning dataset which provisioning dataset has been used for training and testing the certain predictive model; (b) a result classification associated to the historical provisioning dataset of (a); and (c) the selected next provisioning dataset classification associated to (a) and (b) according to the historical record stored in developer history area 2105. In other words, (c) will be the selected historical next selected provisioning dataset selected by a developer user on observation of the result of (b) where the certain predictive model has been subject to training with use of the dataset described in (a).

On application of multiple iterations of the described training set dataset, machine learning model 9002 can learn the relationship between an applied dataset applied for training, a test result associated to the applied training dataset, and selected next training dataset that is the best next dataset based on historical behavior of a crowdsourced set of historical developer users.

Machine learning model 9002, once trained, is able to respond to query data. Query data for query of machine learning model 9002 of FIG. 5 can include certain provisioning dataset classification in combination with a certain result classification the certain provisioning dataset classification. The output of the machine learning model 9002 in response to the described query data can be a predicted provisioning dataset predicted to be selected by a developer user based on the certain provisioning dataset classification in combination with a certain result classification and based on the training of machine learning model 9002, which can include crowdsourced training data that specifies historical dataset selection actions of a plurality of historical developer users.

Developer system 110 as shown in FIG. 1 can store in decision data structures area 2106 a plurality of instances of machine learning model 9002, each instance for one model of the set of models M subject to training and testing at block 1005. Machine teaming model 9002 can be trained for predicting developer user behavior in reference to a particular one model of a set of models M subject to training and testing at block 1005. Developer system 110 can be configured so that the instances of machine teaming model 9002 can be periodically re-trained and updated throughout the deployment period of system 1000.

System 1000 can be configured so that developer system 110 periodically queries the trained machine teaming models 9002 in order to update the action decisions of Rows 2 through 4 and similarly configured rows of the decision data structure of Table A so that the action decision associated with Rows 2 through 4 is always current.

In another embodiment, developer system 110 at action decision block 1006 can query instances of machine learning model 9002 directly for return of a prediction as to a developer user's selection for a next training dataset. At action decision block 1006, developer system 110 can query instances of machine teaming model 9002 for return of predictions as to a developer user's selection for a next training dataset for each model of the model set M. In such variation, query data applied to respective instances of machine learning model 9002 can include, for the respective models for the model set M, the most recent provisioning dataset classification for training the respective model in combination with the most recent result classification.

Referring to Row 5 of the decision data structure of table A, developer system 110 using the decision data structure of table A can in some instances return the action decision to prompt for use as a next dataset for training and testing, a provisioning dataset that has a threshold satisfying dissimilarity with respect to most recently applied provisioning dataset. As shown by Row 5, the action decision to prompt for application of a training dataset having a threshold level of dissimilarity with a most recently applied dataset can be in dependence on result data specifying one or more result of the testing and training at block 1005.

With reference to Row 6 through 8 of the decision data structure of Table A, it is seen that in some scenarios when there is a dataset used for training mapped to a particular result, developer system 110 can recommend the generation of a dissimilar dataset satisfying a dissimilarity threshold with respect to the most recently applied dataset. Embodiments herein recognize that the full functioning of a predictive model can be better ascertained by use of training using a dataset having threshold satisfying dissimilarity once a first performance attribute is detected. The performance boundaries of a particular predictive model can be efficiently explored in this manner. For selecting a dataset having a threshold satisfying dissimilarity with a prior, e.g., most recently applied dataset, developer system 110 can compare an extracted dataset characterizing set of parameter values associated to the prior applied dataset to dataset characterizing sets of parameter values associated to remaining synthetic datasets stored in synthetic data area 2101. For each comparison, developer system 110 can aggregate (e.g., add) differences for each parameter of a parameter value set to provide a dataset dissimilarity parameter value. Developer system 110 can generate an ordered list of datasets ranked in order of similarity to the prior applied dataset. Developer system 110 can determine that a certain dataset has a threshold satisfying dissimilarity with a prior applied dataset when its dissimilarity parameter value satisfies a threshold. In some scenarios, developer system 110 can use a dataset having the maximum dissimilarity with a prior applied dataset as the dataset having a threshold satisfying dissimilarity.

Referring to Row 9, developer system 110, in some scenarios, can relegate recommendation one or more dataset for application in a next iteration of training and testing of a predictive model in dependence on result data from testing the predictive model. Embodiments herein recognize that the relegation of datasets from being recommended for training and testing can avoid unnecessary processes and lead to the expeditious identification of a working set of one or more predictive model. The relegation of certain datasets from prompting data can reduce the risk of the developer user selecting a dataset for a next iteration of training that will yield little or no discovery of attributes of a model being subject to training and testing. Presented prompting data associated to the action decision of Row 1 presents indictors of one or more dataset that is relegated by the action decision of Row 9 in a relegated manner, e.g., without any highlight, by requiring separate action to access the indication, by display in smaller text font (e.g., text 3129 as shown in FIG.

6), greyed-out font (as opposed to black font), by display at a lower height than a dataset indicator that is not relegated, etc.

Figure 6:
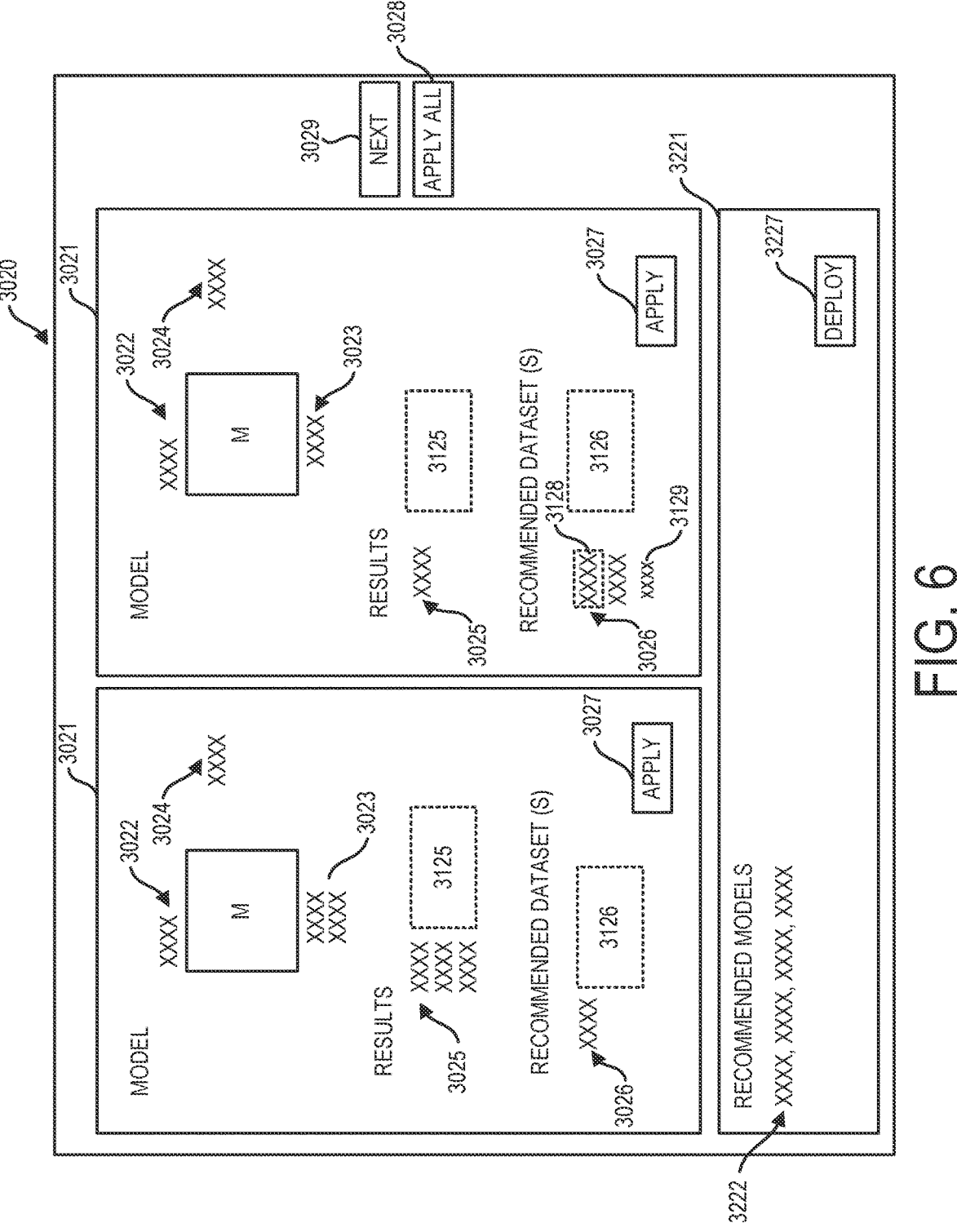
FIG. 6 depicts a user interface for display on a developer user UE device according to one embodiment.

Prompting data that specifies a prioritized dataset can preferentially prompt for selection of the prioritized dataset over one or more other dataset. Prompting data that specifies a relegated dataset can preferentially prompt for selection of one or more other dataset having associated presented text over the relegated dataset. Referring to FIG. 6, text 3128 specifying a prioritized dataset can be presented with a highlight as indicated (a bordered area with a shading) and can be presented at a highest order and height within text area 3026, and text 3129 specifying a relegated dataset can be presented at lowest order and height within text area 3026 and can be presented with relatively smaller font than remaining text of text area. The presented text areas 3026 of prompting area 3020 as shown in FIG. 6 can be active text areas so that when text, such as text 3128 or text 3129, specifying a certain one dataset is clicked on, the selected clicked on text can be displayed with a different visualization to indicate that it is active and has been clicked to select a certain dataset for a next iteration of training and testing. User interface 3000 having prompting area 3020 can be configured so that the actuation of an apply actuator 3027 or actuator 3028 results in application for training and testing of one or more predictive model of dataset(s) having associated active text which has been clicked on for activation in the manner described in connection with FIG. 6.

Various available tools, libraries, and/or services can be utilized for implementation of machine learning model 9002. For example, a machine teaming service can provide access to libraries and executable code for support of machine teaming functions. A machine teaming service can provide access set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, and monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, and monitoring and retraining deployed models. Training machine learning model 9002 can include use of, e.g., support vector machines (SVM), Fourier curve fitting, Bayesian networks, neural networks, and/or other machine learning technologies.

Returning to FIG. 2, on completion of action decision block 1006 to return an action decision to present prompting data, developer system 110 can proceed to block 1007. At block 1007, developer system 110 can perform prompting to prompt a developer user to take subsequent action. Developer system 110 performing prompting at prompting block 1007 can include developer system 110 sending for presentment on UE device 120A of a developer user prompting data. The prompting data can include prompting data defined by, e.g., results data and recommendations data. The prompting data can be in the form of, e.g., textual data, graphical data, and/or audio data.

Prompting data presented at block 1007 can include prompting data as explained with reference to FIG. 6. Shown in FIG. 6, developer system 110 can present and provide for presentment on a display of UE device 120A various prompting data. Prompting area 3020 can include respective areas 3021 arranged for presentment of prompting data for different models, text area 3022 specifying a model identifier, text area 3023 specifying model attributes, e.g., classification and other attributes, text area 3024 specifying identifiers for datasets applied for training and testing at block 1005, results text area 3025 specifying results of the application of the tests described with reference to training and testing block 1005 (FIG. 2), and recommended datasets text area 3026 in which prompting areas 3020 can present text based prompting data that prompts for selection of one or more dataset for performance of a supplemental training testing iteration involving a certain supplemental dataset. The recommended dataset area 3026 can display identifiers for recommended next training and testing datasets for training and testing a predictive model. The prompted for one or more dataset can be a dataset of synthetic data area 2101. The prompted for one or more dataset can be a time series dataset of synthetic data area 2101. The prompted for dataset can be currently present in synthetic data area 2101 or can be currently absent from synthetic data area 2101. Where the prompted for dataset is absent from synthetic data area 2101, developer system 110 can generate the prompted for dataset by running of generating process 112 as explained in reference to FIG. 1 in response to its selection and can store the generated synthetic dataset into synthetic data area 2101. Prompting area 3020 can also include results visualization area 3125 for presentment of visualized results and recommended datasets visualization area 3126 for presenting visualizations of prompted for datasets.

Referring to further aspects of prompting area 2020 as explained with reference to FIG. 6, there is presented apply actuator 3027 which actuated results in the recommended datasets being applied for training and testing of the depicted predictive model specified in area 3022. By activating global apply actuator 3028, developer system 110 can apply all recommended tests across all models.

Referring to FIG. 6, it is seen that a developer user can use prompting area 3020 of user interface 3000 to train and test multiple multiples, e.g., all M models subject to training and testing at block 1005. For provisioning a next model in accordance with presented prompting data, a developer can click on next actuator 3029. In one embodiment as explained with reference to block 1005, developer system 110 during an initial pass of training and testing block 1005 can train and test all M models with a single common dataset, e.g., a synthetic (potentially generated on demand) dataset stored in synthetic data area 2101 having a threshold satisfying similarity with an enterprise dataset specified using enterprise data area 3011.

However, for a next iteration of training and testing, training and testing datasets of synthetic data area 2101 can be selected to be differentiated between the models of the M models based on different prompting data for the different models of the M models subject to training and testing at block 1005. Developer system 110 can be configured to use the decision data structure of Table A, instances of machine learning model 9002, and/or other decision data structures for return of different prompting action decisions for respective ones of the M predictive models subject to training and testing at block 1005 and referenced in prompting area 3020. Accordingly, a developer user using system 1000 has precise control over the training and testing of different predictive models, so that a developer user can rapidly generate performance data for different respective models, in which performance data can specify performance barriers of the respective predictive models. Table B illustrates a possible training scenario for training models M1, M2, and M3 during initial and second training and testing iterations.

TABLE B

| Training and testing iteration | M1 training and testing dataset | M2 training and testing dataset | M3 training and testing dataset | Comment |
|---|---|---|---|---|
| Initial | D005 | D005 | D005 | Dataset D005 can be selected based on having a threshold satisfying similarity with a specified enterprise dataset |
| Second | D012 | D007 | D017 | Different datasets can be recommended for the respective models in dependence on differentiated test result data for the various models |

Figure 7:
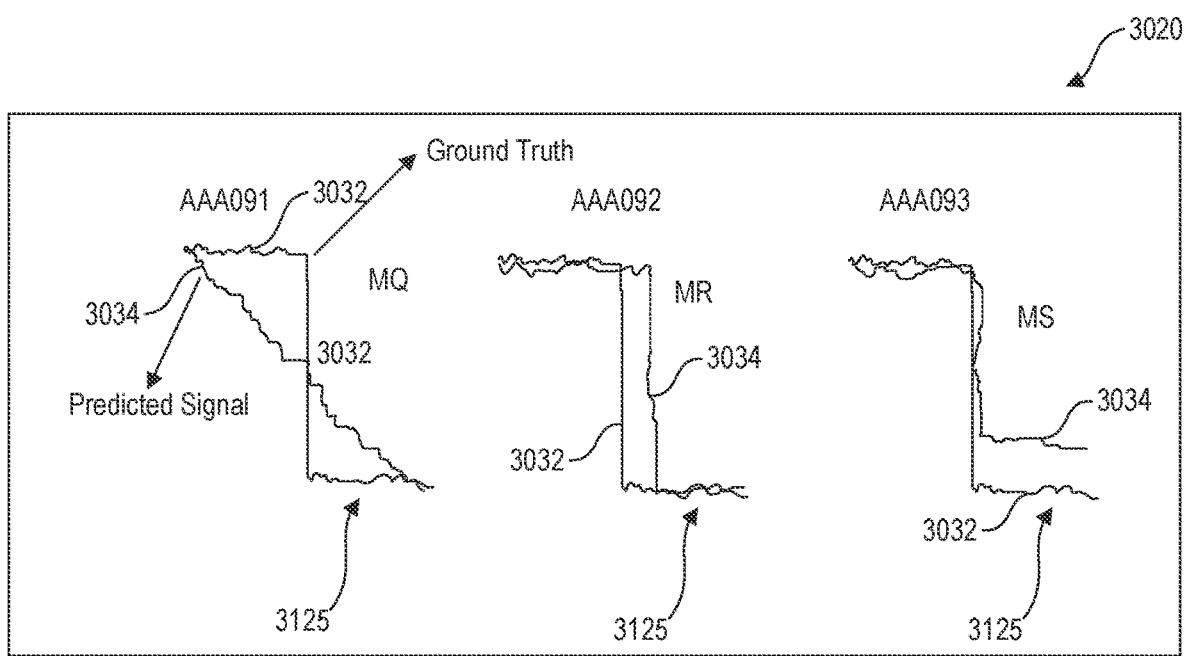
FIG. 7 depicts a user interface for display on a developer user UE device according to one embodiment.

FIG. 7 illustrates an example of visualization prompting data provided by results visualization areas 3125. Embodiments herein recognize that for various types of datasets, such as time series datasets, quantitative performance evaluation of machine learning model can be insufficient. For example, consider FIG. 7, where the predicted signal output 3034 of three time series models MQ, MR, and MS is visualized along with the ground truth 3032. When Euclidean distance (such as MSE or MAE) is calculated between predicted signal and ground truth signal, the quantitative performance is almost identical across three models MQ, MR, and MS. However, depending upon the evaluation criteria or application need, one model is more preferred than the other. For example, in case of model MS, it might be possible that model is not trained to predict the value lower than some value. Such qualitative feedback can be determined with use of the visualization presentment of FIG. 7.

Figure 8:
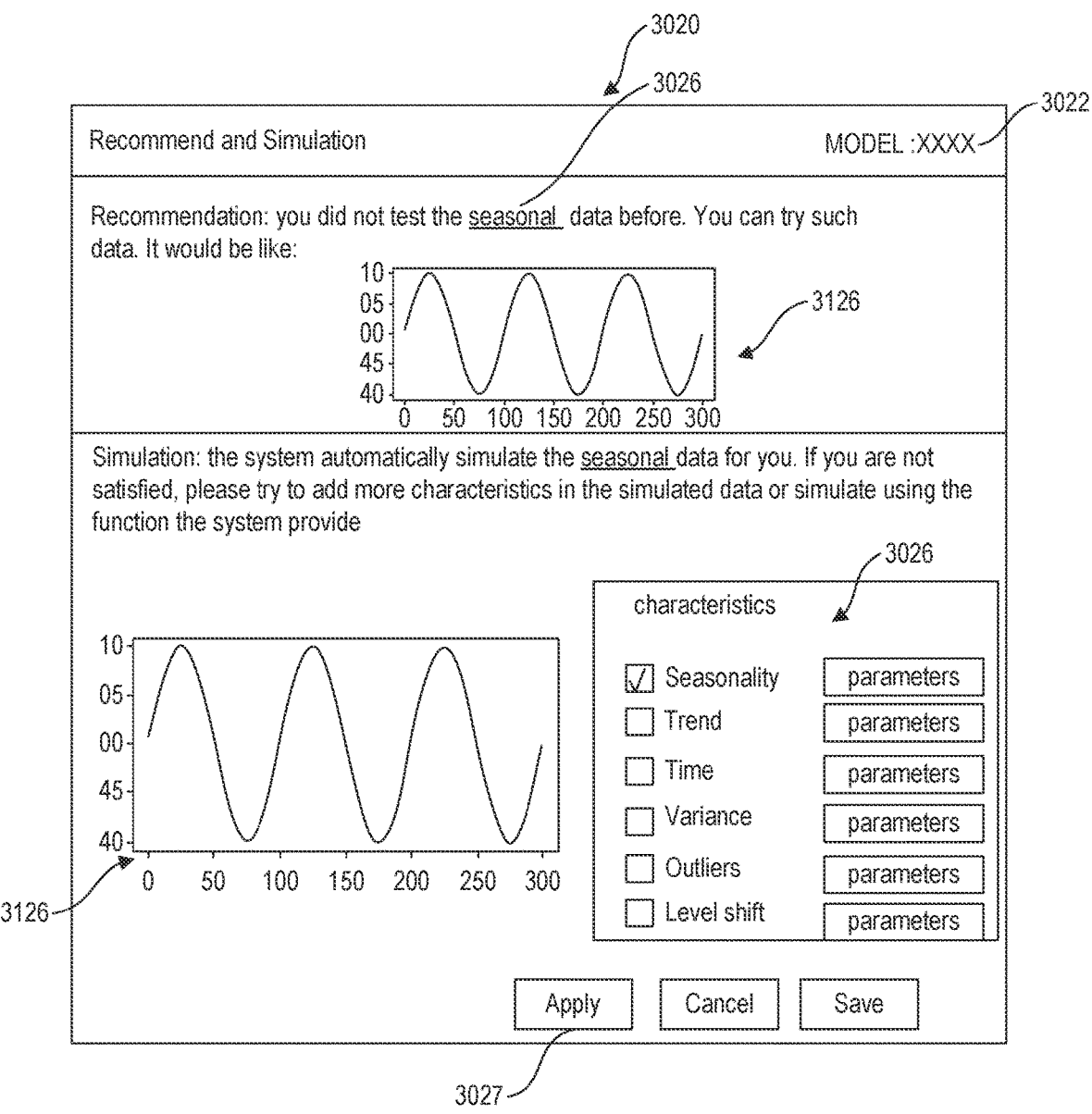
FIG. 8 depicts a user interface for display on a developer user UE device according to one embodiment.

FIG. 8 illustrates examples of visualization prompting data including recommended datasets visualization areas 3126. In the example of FIG. 8, a prompted for next dataset can include a seasonal classified dataset based on an action decision at block 1006, and other next dataset options are possible including trend, time, variance, outliers, and level shift. By clicking on apply actuator 3027, a developer user can activate next training and testing. While prompting for the dataset "seasonality" is prioritized in the example of FIG. 8, a developer user can override the recommended dataset and select another option. Data of the developer user's selection can be recorded into developer history area 2105 and can be used to train machine learning model 9002 to impact future predicted selections by future developer users using system 1000.

Figure 9:
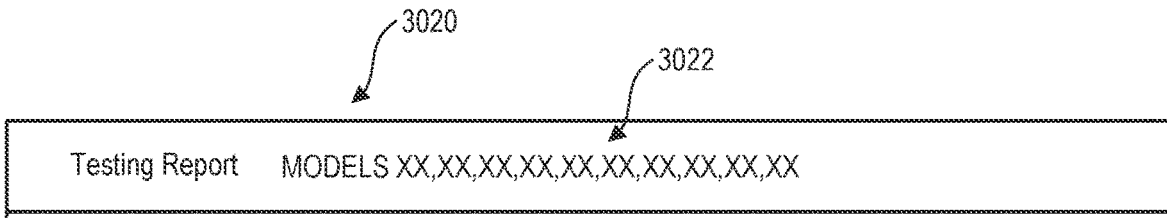
FIG. 9 depicts a user interface for display on a developer user UE device according to one embodiment.
Figure 9:
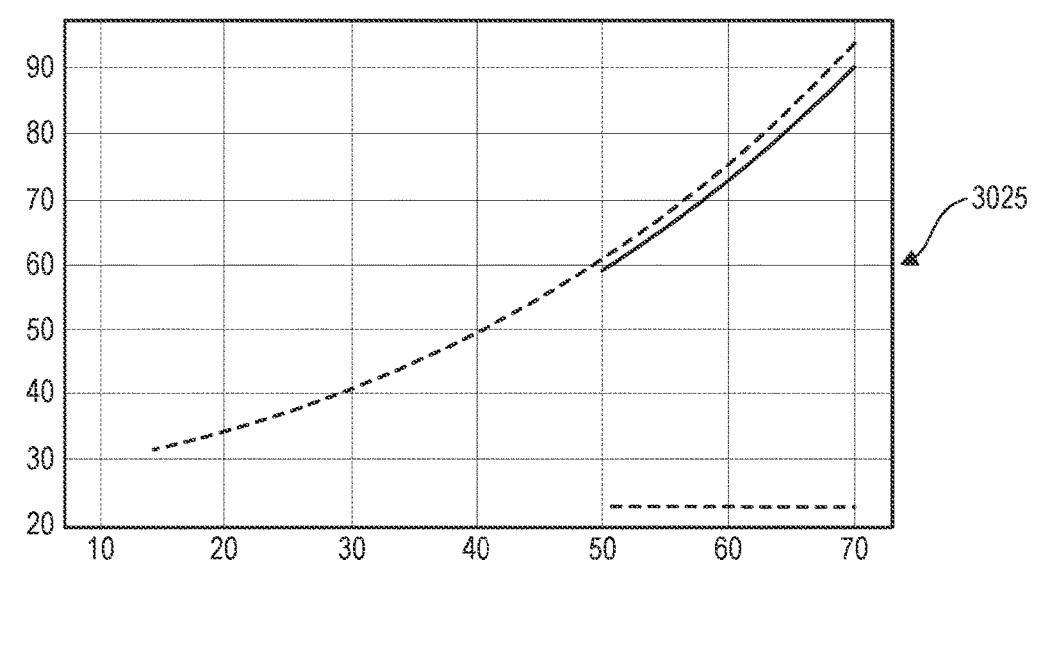

FIG. 9 illustrates an example of visualization prompting data provided by results visualization areas 3125. The qualitative visualization data presented as shown in FIG. 9 can reveal properties of predictive models not possible or practical with use of quantitative data.

Figure 2:
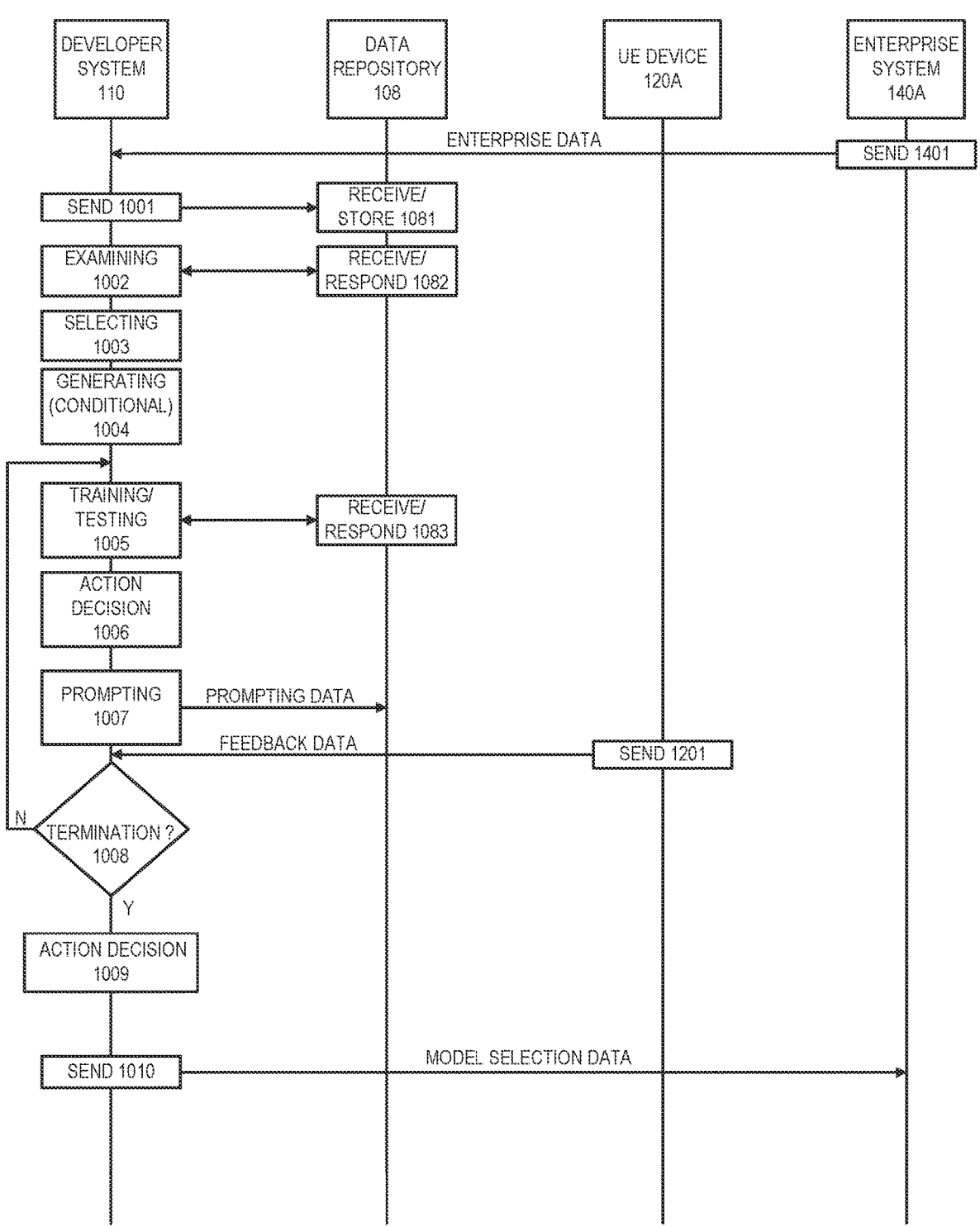
FIG. 2 is a flowchart illustrating a method for performance by a developer system interoperating with an enterprise system and a client UE device according to one embodiment.

Referring further to the flowchart of FIG. 2, UE device 120 at block 1201 can send feedback data for processing by developer system 110. The feedback data can be defined by the developer user actuating in response to presented prompting data certain selections of prompting area 3020 such as by selecting dataset by clicking on a text area 3026 for the same and by actuation of apply actuators 3027 and/or 3028 as shown in FIG. 6.

At block 1007, developer system 110 can determine whether a termination condition has been satisfied. In the case that a developer user has defined feedback data indicating that further testing and training will occur, the termination condition can be regarded not to be satisfied at block 1007 and developer system 110 can iteratively perform the loop of block 1005 to 1007 until the termination condition is satisfied. The termination condition can be satisfied, e.g., on developer system 110 failing to recommend an additional dataset for testing of any model, on the developer user activating a control actuator presented on user interface 3000 indicating that training and testing is complete, or on developer system 110 determining that result data associated to models of the set of M models indicates that a set of one or more model within the set of M models subject to training an testing capable of performing according to criteria of an enterprise application. In the presentment of prompting data as explained with reference to FIG. 6, developer system 110 can perform an action decision as explained with reference to the decision data structure of Table A.

Referring to FIG. 6, prompting area 3020 can include recommended model area 3221 in which recommended models of the set of M models can be recommended after each iteration and testing of the set of M models. Recommended model area 3221 can include a text based list of K models out of the set of M models which are currently recommended for deployment in an enterprise application of the enterprise associated to the enterprise data specified using enterprise data area 2102. Developer system 110 can determine the list of K models by examining result data associated the tested set of M models.

Various criteria can be applied for providing a list of recommended predictive models for presentment on model recommendation area 3221. According to one use case, developer system 110 can perform the following process at action decision block 1006 to determine a recommend set of K predictive models for deployment on enterprise system 140A: (a) sort the M models based on performance under test; (b) generate a list K of top K performing models; (c) identify failure conditions of models on the list K; (d) for every failure condition identified in (c), confirm that there are at least two models of the list K without the failure condition and (e) if necessary to satisfy the criterion of of (d) replace model(s) of the list K, with next highest scoring models of the models M until the criterion of (c) is satisfied; and (f) label the finalized list K (after (e) is performed) as the finalized list K for specifying within presented prompting data. At block 1006, developer system 110 can return an action decision to determine a recommend list K of K models for deployment in an ensemble model deployment scenario in which multiple models can be deployed, some having areas of less than optimal performance but which are balanced by the providing of supplemental models that are stronger in the weaker areas. Prompting data 3222 provided by text data specifying the recommend list K of K models can be displayed within model recommendation area 3221 as illustrated in FIG. 6. For performance of (a) sort the M models based on performance under test, developer system 110 can aggregate for each respective model of the set of M models all test results applied to the respective models. Developer system 110 can increment for respective models a performance parameter value counter for model tests having a positive (e.g., "pass") result and decrement for respective models the performance parameter value counter for model tests having a negative (e.g., "fail") result.

The termination condition of block 1007 can be satisfied, e.g., on developer system 110 failing to recommend an additional dataset for testing of any model, on the developer user activating a control actuator such as deploy actuator 3227 presented on user interface 3000 indicating that training and testing is complete, or on developer system 110 determining that result data associated to models of the set of M models indicates that a set of one or more model within the set of M models subject to training an testing capable of performing according to criteria of an enterprise application. A developer user can actuate deploy actuator 3227 to trigger a termination condition detected at block 1007 and to deploy the set of recommended models in an enterprise application. Alternatively, with reference to prompting area 3020 illustrated in FIG. 6, a developer user can, rather than actuate deploy actuator 3227, use actuator 3027 or actuator 3028 to continue with a next iteration of training and testing of the set of M models.

On the termination of a session, developer system 110 can proceed to action decision block 1009 to perform an action decision and then to block 1110 to send model selection data to enterprise system 140. The action decision performed at block 1109 can be an action decision to send certain model selection data to an enterprise system such as enterprise system in accordance with models recommended by developer system 110, and/or developer defined inputs that are defined using user interface 3000. Model selection data can include specification data specifying certain models of a model set subject to training and testing at block 1005 that are recommended for deployment in enterprise system 140A, e.g., the list of K models explained with reference to recommended models area 3221 of FIG. 6. For performance of block 1008, developer system 110 can perform processing to identify a set of recommended predictive models based on testing results resulting from application from training and testing block 1005.

Figure 10:
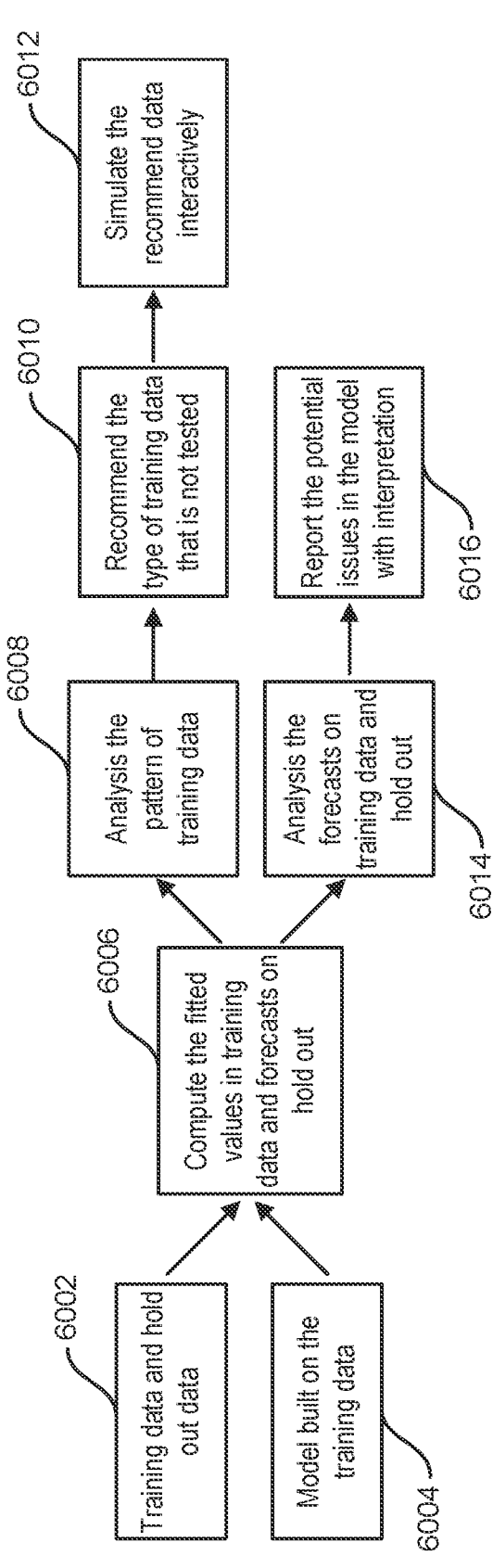
FIG. 10 is a flowchart illustrating a method for performance by a developer system according to one embodiment.

A method 6000 for performance by developer system 110 is set forth in reference to FIG. 10. Holdout data can be parsed from training data of training dataset (block 6002). The training data and holdout data can be split by predefined parameters. For example, 80/20 means 80 percent of old data for training and 20 percent latest data for holdout. At block 6004, a model can be built based on the training data. Models that can be trained can include, e.g., predictive models having such operating classifications as neural network (NN), support vector machine (SVM), linear regression, Holt-Winter, ARIMA, random forest, and others.

Developer system 110 at block 6006 can compute the fitted values in training data and can provide forecasts on holdout. Based on the model built, a fitted value for each time period can be computed using 1-step-ahead forecast. For the holdout, it can be assumed that this data is unseen, and a user h-step-ahead forecast for each time period can be provided.

At block 6008, developer system 110 can perform analysis on a dataset used as training data for extraction of parameter values from the training data. At block 6008, parameter values for the following parameters can be extracted: stationary, seasonality, trend, unit root analysis, time dependency, variance, variability, outliers, level shift, and topic. Various tools can be used, e.g., the autocorrelation function (ACF) and/or spectrum analysis. Developer system 110 at block 6010 can recommend the type of training data that is not tested, label the data using the characteristics of the data, for example seasonality and trend, and compare the labels with the library of the labels defined by synthetic data area 2101.

In the library defined by synthetic data area 2101, there can be stored many labels of time series. The labels can be collected from the designers who claimed what kind of time series can support. At the beginning of a session, all the labels can be marked as "Not Tested". If the label of the data is not available in the library defined by synthetic data area 2120, then the library will be updated to include the new data and the label which then is marked as "Tested". If the label of the data is available in the library, then the label can be marked as "Tested". Embodiments herein can provide recommends as to a time series dataset that the tester did not test before. A sequence chart can be presented to a developer user that sets forth characteristics of a dataset.

Developer system 110 at block 6012 can simulate the recommend data interactively. An interactive simulation method can help a developer user to simulate time series data. Developer system 110 can automatically simulate the data according to the recommended characteristics, for example, seasonality data. A developer user can revise the data by revising the parameters of the characteristic or by adding other characteristics. If a developer user is satisfied with the simulated data, then the developer user can save the data to further testing.

At block 6014, developer system 110 can perform analysis of forecasts on training data and holdout. Comparison of measurements between (a) predictive models trained on the training data and (b) holdout can be provided. At block 6014, developer system 110 can compute time series model quality measures in both training data and holdout data, such as mean square error (MSE), mean absolute percentage error (MAPE), Symmetric mean absolute percentage error (SMAP), and others. For each measure, developer system 110 can compute the difference of the measure between the training data and holdout data. Developer system 110 can perform analysis the patterns of the residuals in the holdout. Developer system 110 can compute the difference (residual) between the forecast values forecast using trained predictive models and holdout. Developer system 110 can extract the patterns of residuals by the described analysis. Examples of patterns identified in a residual can include: (A) Most of residuals are positive or negative (95 percent holdout data are larger or less than forecast values); (B) The residual has trend; (C) There is mean shift in the residual; and (D) There is a variance change in the residual. At block 6016, developer system 110 can report potential issues with models and can provide interpretations of the problems.

Embodiments herein can provide a one-shot testing procedure that can guide developer user in preparing time series datasets and identify potential issues of a trained model trained for predicting time dependent phenomena. Embodiments herein can include (1) using predefined parameters to split training data and holdout data, and building trained models on training data, then compute the fitted values in training data, and compare forecasts by trained predictive models to holdout for testing the predictive models. Embodiments herein can include (2) analyzing the pattern of training data, such as stationary, trend, etc., then automatically recommend the type of training data that is not tested based on test result data provided by the pattern analysis on existing data. Embodiments herein can include (3) generating the recommended data interactively for user to further test in dependence on test result data from testing trained predictive models. Embodiments herein can include (4) analyzing the fitted values on training data and holdout data to identify whether there are some issues in the time series models automatically. Embodiments herein can include (5) analyzing whether the model is overfitting based on the accuracy on training data and holdout data automatically. Embodiments herein can include (6) analyzing whether there are some deterministic patterns in the residuals on holdout data using a predefined set of checklists. Embodiments herein can include (7) reporting of potential issues in the models with visualization and interpretation.

According to one embodiment, a user of system 1000 can generate X number of datasets with varying characteristics automatically. All predictive models can be run after being trained on the prepared datasets. A deterministic check can be applied to identify one or more weak model (weak mean the algorithm with many deterministic issues). Knowledge of "deterministic patterns" with qualitative label can generate meaningful labels to the end user. Models can be ranked based on the issues and sent back to develop for fixing.

Embodiments herein recognize that software testing is an important activity in computer science. An automation system can comprise set of models M comprising one or model that are being explored in some order such that the best model(s) can be selected. Embodiments herein recognize that for selection of a best model, models can be tested. Embodiment herein can include predictive model quantitative performance evaluation. For example, given a trained set of models M, the quantitative performance for regression task can include metrics such as MSE of trained set of models M on an unseen holdout dataset. Embodiments herein can also include qualitative testing of predictive models as well as prompting data features that can interactively prompt a developer user to develop a well-formed predictive model.

Embodiments herein recognize that in case of various datasets including a time series case, a visual representation can help to discover a potential issue. Embodiments herein recognize that it is non-trivial task for a tester to visually plot the model results and identify the potential issues. Embodiments herein can include qualitative evaluation of a trained time series forecasting model.

Embodiments herein can identify potential issues with trained predictive models along with an explanation. Embodiments herein can include a one-shot testing procedure that is provided for all models and for all testing datasets. Embodiments herein can provide analysis of the patterns of existing training data and can recommend what kind of time series data for use in training and testing a predictive model should be prepared. A recommended type of time series data can be displayed in a sequence chart. According to one embodiment a simulation module can simulate the represented time series data automatically.

Embodiments herein can provide analysis of predicted values in holdout to identify whether there are some issues in a predictive model trained to predict time series data. Embodiments herein can provide analysis of whether a model is overfitting based on the accuracy on training data and holdout data automatically. Embodiments herein can provide analysis of whether there are some deterministic patterns in the difference between predictions and holdout data. Embodiments herein can provide a visualization and interpretation for the identified issue.

According to one embodiment, a developer system 110 can provide a checklist of report items as follows: (1) whether the trained model provides a constant prediction; (2) whether the trained model provides a consistent under prediction; (3) whether the trained model provides a consistent above prediction; (4) whether the trained model provides a linear trend prediction, i.e., upward or downward; (5) whether the trained model provides a follower prediction, i.e., if there is realignment of the prediction outcome, there significant improvement in performance; (6) whether the trained model provides a single off prediction, i.e. whether a threshold, e.g., 90 percent of error comes from one prediction; (7) whether the trained model provides a part of constant prediction toward the end, i.e., whether the model has not learned the trend beyond this point, deep learning model reach to maximum saturation points; (8) whether the trained model provides a constant difference prediction, i.e., if one takes difference of adjacent prediction, it turns out to be constant; and (9) whether the trained model provides a step prediction.

Developer system 110 can report the potential issues in the model with interpretation. Developer system 110 can report whether there is overfitting based on the difference measure of training and holdout. Developer system 110 can report whether there are some issues of model based on the residual patterns. Developer system 110 can output below holdout data and forecast values, and give some interpretation such as the prompting text: "all predictions are less than the holdout."

With use of developer system 110, a developer user can generate X number of datasets with varying characteristics for training and testing a set of M models. All of the M models can be trained and run on the all the prepared datasets. A deterministic check can be applied to identify the weakest models (weak meaning the algorithm with many deterministic issues). Deterministic patterns can be generated. Test models can be ranked based on the issues and sent back to develop for addressing.

As set forth herein, developer system 110 can perform natural language processing (NLP) for extraction of topic (domain) from enterprise datasets and/or documents associated to enterprise dataset and enterprises as well as for extraction of topic (domain) from synthetic datasets and/or documents associated to synthetic datasets. Developer system 110 performing NLP can include developer system 110 performing one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters, e.g. one of more "social tendency" NLP output parameter or one or more "writing style" NLP output parameter. Developer system 110 performing natural language processing can include developer system 110 performing (a) topic classification and output of one or more topic NLP output parameter for a received message, (b) sentiment classification and output of one or more sentiment NLP output parameter for a received message, or (c) other NLP classifications and output of one or more other NLP output parameter for the received message. Topic analysis for topic classification and output of NLP output parameters can include topic segmentation to identify several topics within a message. Topic analysis can apply a variety of technologies, e.g., one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment, sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Certain embodiments herein may offer various technical computing advantages and practical applications involving computing advantages to address problems arising in the realm of computer systems and computer networks. Embodiments herein can provide dynamic and interactive user interface functionality guiding a developer user with use of prompting data so that predictive models for modeling an enterprise dataset can be rapidly tested and selected for deployment into an enterprise application. Embodiments herein can include features for identification of one or more synthetic dataset having threshold similarity with an enterprise dataset to be modeled and features for training and testing set of models using such one or more synthetic dataset. Embodiments herein can include providing prompting data to developer user that prompts the developer user to select the next dataset for training and testing of a predictive model subsequent to initial training and testing iteration. Prompting data can include results data that specifies results of a prior training and testing session as well as recommendation data recommending selection of one or more dataset for use in a next iteration of training and testing of a predictive model. Embodiments herein can include features to evaluate test results associated with trained predictive models in the generation of model selection data that specifies one or more model that can be used for deployment of predictive models in an enterprise system application. Embodiments herein can include features so that prompting data can be restricted so that prompting data can be absent of prompting data permitting selection of certain datasets identified as being unlikely to be useful in revealing additional attributes of predictive model. Thus, embodiments can prevent the performance of wasteful actions of a developer user. Embodiments herein can include features so that prompting data presented to a developer user can be provided in dependence on result data associated to a prior dataset used for training a predictive model. Embodiments herein can include features involving parameter value extraction. Embodiments herein can include processing of dataset to extract dataset characterizing parameter values thereof and using extracted dataset characterizing parameter values sets for comparing different datasets having threshold satisfying similarities and, in some cases, dissimilarities can be identified and used in purposefully prompted for training iterations. Embodiments herein can permit training and testing of predictive models with minimal iterations of training and testing so that performance attributes can be rapidly used for model selection and deployment and so that a developer user can be efficiently guided with prompting data in the development of well performing predictive models in an enterprise application. Embodiments herein can provide model selection data that can specify a plurality of models for use in deployment in an ensemble model configuration. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks, such as artificial intelligence platforms and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 11:
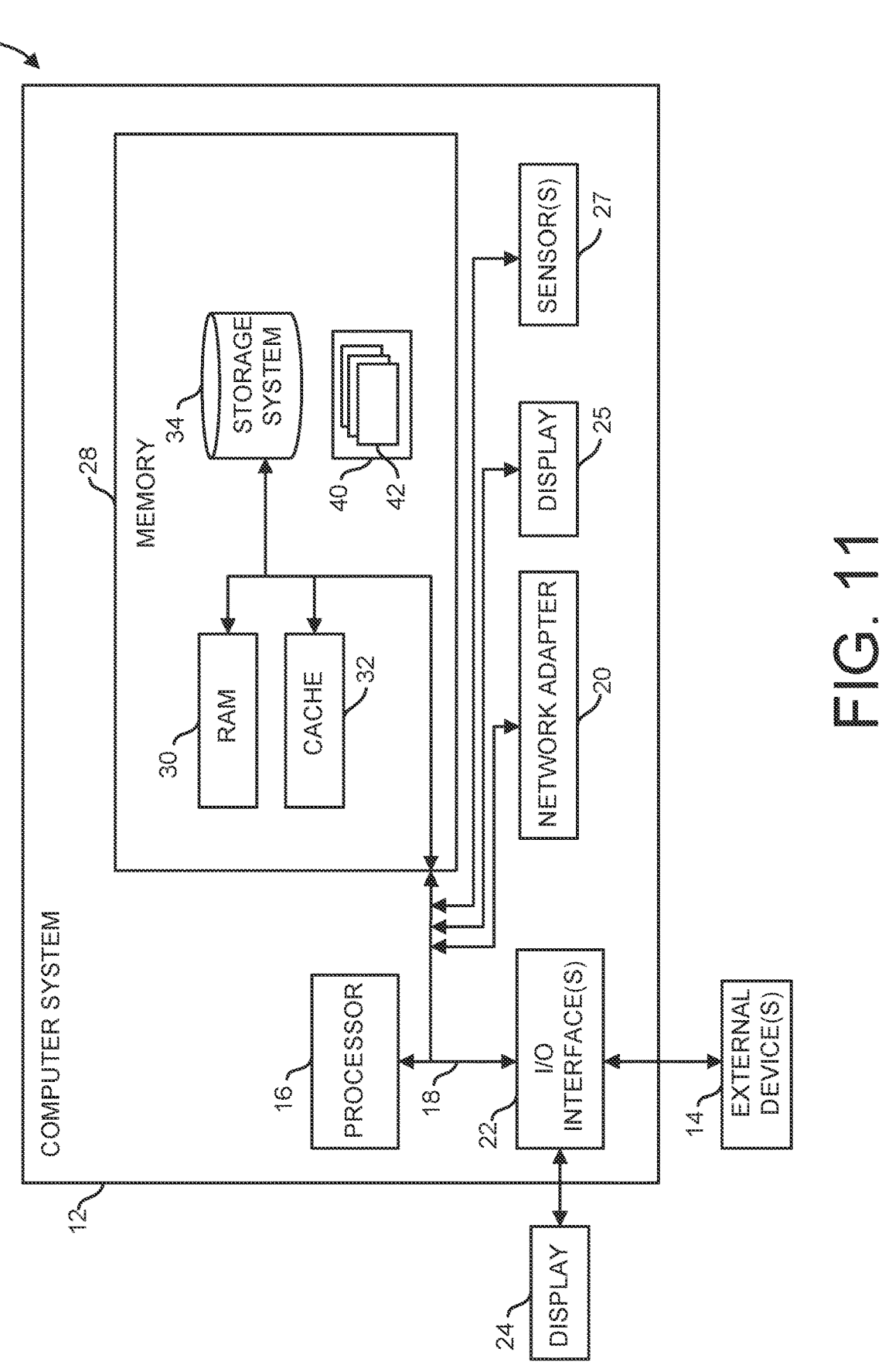
FIG. 11 depicts a computing node according to one embodiment.
Figure 12:
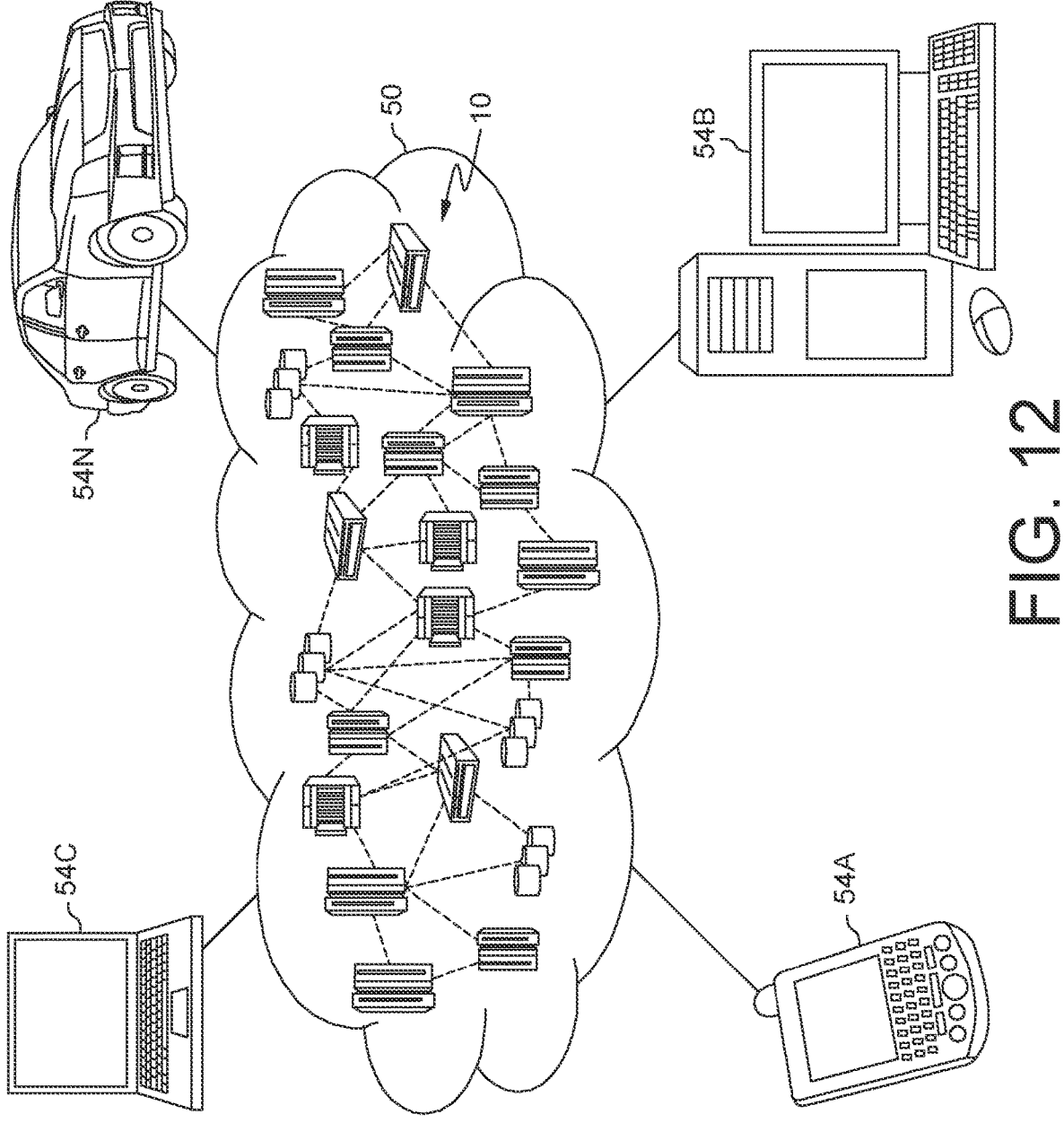
FIG. 12 depicts a cloud computing environment according to one embodiment.
Figure 13:
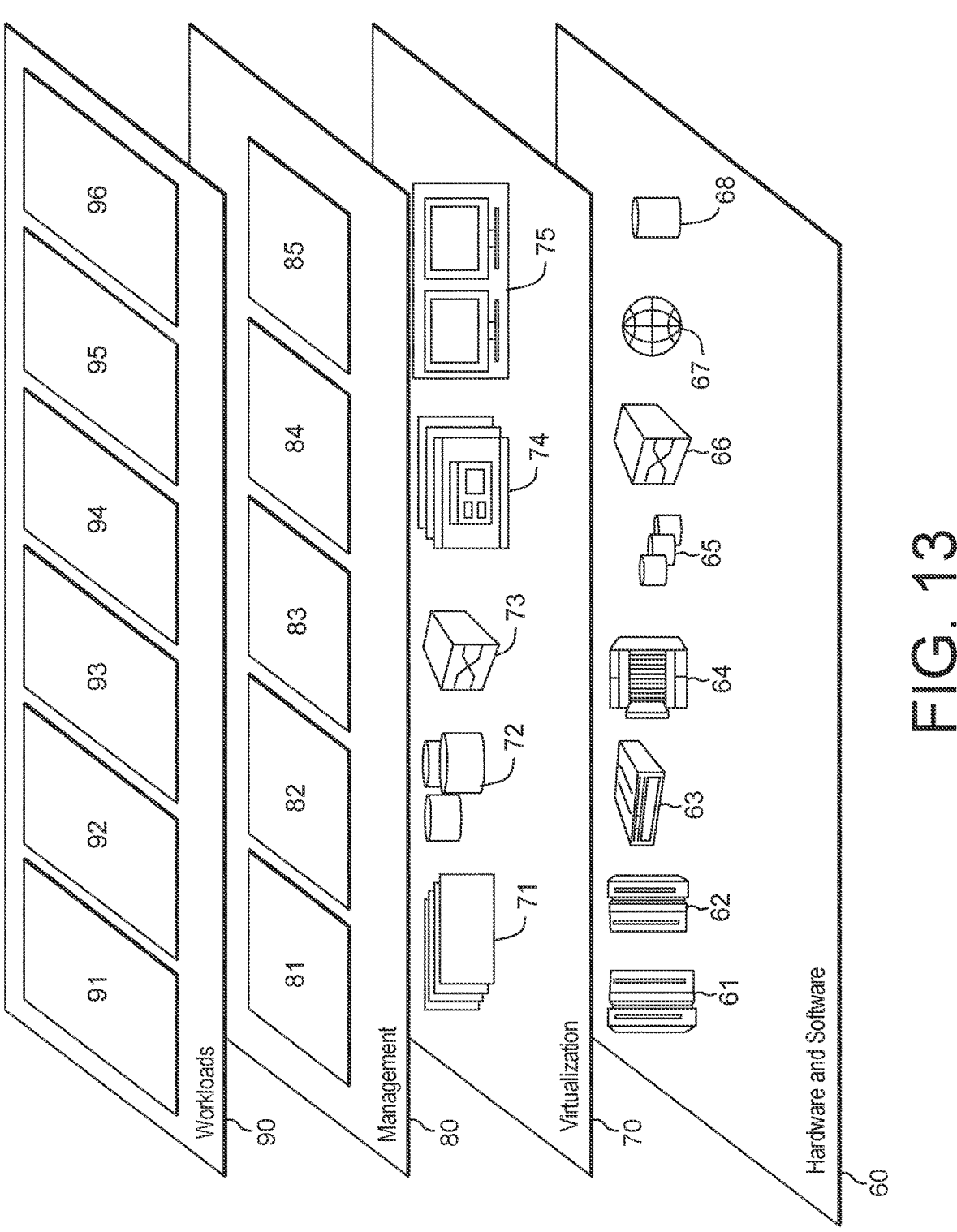
FIG. 13 depicts abstraction model layers according to one embodiment.

FIGS. 11-13 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 11, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 11, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 12-13.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, developer system 110 can include one or more computing node 10 and can include one or more program 40 for performing functions described with reference to developer system 110 as set forth in the flowchart of FIG. 2, and with reference to the flowchart of FIG. 10. In one embodiment, one or more client UE device 120A-120Z can include one or more computing node 10 and can include one or more program 40 for performing functions described with reference to one or more UE device 120A-120Z as set forth in the flowchart of FIG. 2. In one embodiment, one or more enterprise system 140A-140Z can include one or more computing node 10 and can include one or more program 40 for performing functions described with reference to one or more enterprise system 140A-140Z as set forth in the flowchart of FIG. 2. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g., can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 12 computing node 10 is described as being implemented in a cloud computing environment and accordingly is referred to as a cloud computing node in the context of FIG. 12.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for dynamically and interactively presenting prompting data as set forth herein. The processing components 96 can be implemented with use of one or more program 40 described in FIG. 11.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:

examining an enterprise dataset, the enterprise dataset defined by enterprise collected data;

selecting one or more synthetic dataset in dependence on the examining, the one or more synthetic dataset including data other than data collected by the enterprise, wherein the examining the enterprise dataset includes subjecting the enterprise dataset to processing for extraction of enterprise dataset characterizing parameter values and comparing the enterprise dataset characterizing parameter values to respective sets of synthetic dataset characterizing parameter values stored in a data repository, wherein the respective sets of synthetic dataset characterizing parameter values characterize respective synthetic datasets stored in the data repository, wherein the selecting one or more synthetic dataset in dependence on the examining includes identifying from the comparing at least one synthetic dataset stored in the data repository having a threshold satisfying similarity with the enterprise dataset and identifying from the respective synthetic datasets stored in the data repository a highest ranked synthetic dataset having a greatest similarity to the enterprise dataset amongst the respective synthetic datasets stored in the data repository, and wherein the selecting one or more synthetic dataset in dependence on the examining includes performing the selecting so that the selected one or more synthetic dataset have the threshold satisfying similarity with the enterprise dataset and include the highest ranked synthetic dataset having the greatest similarity to the enterprise dataset amongst the respective synthetic datasets stored in the data repository;

training a set of predictive models using data of the selected one or more synthetic dataset having the threshold satisfying similarity with the enterprise dataset and including the highest ranked synthetic dataset having the greatest similarity to the enterprise dataset amongst the respective synthetic datasets stored in the data repository to provide a set of trained predictive models;

testing the set of trained predictive models with use of holdout data of the one or more synthetic dataset; and presenting prompting data on a displayed user interface of a developer user in dependence on result data resulting from the testing, the prompting data prompting the developer user to direct action with respect to one or more model of the set of predictive models, wherein the prompting data prompting the developer user to direct action with respect to one or more model of the set of predictive models includes prompting data prompting the developer user to select, in dependence on data of the result data, a certain synthetic dataset for training and testing a certain predictive model of the set of predictive models, wherein the user interface guides the developer user by presenting a recommended datasets text area displaying recommended synthetic datasets including a highlighted dataset indicator distinguishing a recommended dataset from other candidate datasets, and restricts the developer user from selecting an unrecommended dataset for a predictive model such that, during a subsequent iteration, different predictive models are trained on differentiated synthetic datasets.

2. The method of claim 1, wherein testing the set of trained predictive models includes generating a ranked listing of model specific performance metrics, and wherein the user interface presents a model identifier text area that displays the ranked listing to visually correlate each predictive model with its respective performance metric.

3. The method of claim 1, wherein the user interface presents a results visualization area that plots predicted signals produced by multiple predictive models alongside a ground truth signal to enable qualitative comparison of model behavior over a shared time axis.

4. The method of claim 1, wherein the user interface presents a model attributes text area that displays attributes including model type, capacity, and training iteration count, and dynamically updates the displayed attributes in dependence on testing result data.

5. The method of claim 1, wherein the presenting prompting data includes displaying classifications of candidate synthetic datasets by attributes including seasonality, trend, variance, outliers, or level shift, and wherein the classifications are generated by processing metadata of the respective synthetic datasets stored in the data repository.

6. The method of claim 1, wherein the presenting prompting data includes displaying integrated visual guidance that correlates model specific error signals with dataset selection information derived from the testing, enabling the developer user to interpret relationships between error behavior and training data characteristics.

7. The method of claim 1, wherein the presenting prompting data includes querying a machine learning trained model that is trained to predict a next dataset for training a predictive model of the set of predictive models, wherein the trained model is configured using crowdsourced developer action data identifying historical developer selections of synthetic datasets.

8. A system comprising:

a memory;

at least one processor in communication with the memory; and program instructions executable by one or more processor via the memory to perform a method comprising:

examining an enterprise dataset, the enterprise dataset defined by enterprise collected data;

selecting one or more synthetic dataset in dependence on the examining, the one or more synthetic dataset including data other than data collected by the enterprise, wherein the examining the enterprise dataset includes subjecting the enterprise dataset to processing for extraction of enterprise dataset characterizing parameter values and comparing the enterprise dataset characterizing parameter values to respective sets of synthetic dataset characterizing parameter values stored in a data repository, wherein the respective sets of synthetic dataset characterizing parameter values characterize respective synthetic datasets stored in the data repository, wherein the selecting one or more synthetic dataset in dependence on the examining includes identifying from the comparing at least one synthetic dataset stored in the data repository having a threshold satisfying similarity with the enterprise dataset and identifying from the respective synthetic datasets stored in the data repository a highest ranked synthetic dataset having a greatest similarity to the enterprise dataset amongst the respective synthetic datasets stored in the data repository, and wherein the selecting one or more synthetic dataset in dependence on the examining includes performing the selecting so that the selected one or more synthetic dataset have the threshold satisfying similarity with the enterprise dataset and include the highest ranked synthetic dataset having the greatest similarity to the enterprise dataset amongst the respective synthetic datasets stored in the data repository;

training a set of predictive models using data of the selected one or more synthetic dataset having the threshold satisfying similarity with the enterprise dataset and including the highest ranked synthetic dataset having the greatest similarity to the enterprise dataset amongst the respective synthetic datasets stored in the data repository to provide a set of trained predictive models;

testing the set of trained predictive models with use of holdout data of the one or more synthetic dataset; and presenting prompting data on a displayed user interface of a developer user in dependence on result data resulting from the testing, the prompting data prompting the developer user to direct action with respect to one or more model of the set of predictive models, wherein the prompting data prompting the developer user to direct action with respect to one or more model of the set of predictive models includes prompting data prompting the developer user to select, in dependence on data of the result data, a certain synthetic dataset for training and testing a certain predictive model of the set of predictive models, wherein the user interface guides the developer user by presenting a recommended datasets text area displaying recommended synthetic datasets including a highlighted dataset indicator distinguishing a recommended dataset from other candidate datasets, and restricts the developer user from selecting an unrecommended dataset for a predictive model such that, during a subsequent iteration, different predictive models are trained on differentiated synthetic datasets.

9. The system of claim 8, wherein testing the set of trained predictive models includes generating a ranked listing of model specific performance metrics, and wherein the user interface presents a model identifier text area that displays the ranked listing to visually correlate each predictive model with its respective performance metric.

10. The system of claim 8, wherein the user interface presents a results visualization area that plots predicted signals produced by multiple predictive models alongside a ground truth signal to enable qualitative comparison of model behavior over a shared time axis.

11. The system of claim 8, wherein the user interface presents a model attributes text area that displays attributes including model type, capacity, and training iteration count, and dynamically updates the displayed attributes in dependence on testing result data.

12. The system of claim 8, wherein the presenting prompting data includes displaying classifications of candidate synthetic datasets by attributes including seasonality, trend, variance, outliers, or level shift, and wherein the classifications are generated by processing metadata of the respective synthetic datasets stored in the data repository.

13. The system of claim 8, wherein the presenting prompting data includes displaying integrated visual guidance that correlates model specific error signals with dataset selection information derived from the testing, enabling the developer user to interpret relationships between error behavior and training data characteristics.

14. The system of claim 8, wherein the presenting prompting data includes querying a machine learning trained model that is trained to predict a next dataset for training a predictive model of the set of predictive models, wherein the trained model is configured using crowdsourced developer action data identifying historical developer selections of synthetic datasets.

15. A computer program product comprising:

a computer readable storage medium readable by one or more processing circuit and storing instructions for execution by one or more processor for performing a method comprising:

examining an enterprise dataset, the enterprise dataset defined by enterprise collected data;

selecting one or more synthetic dataset in dependence on the examining, the one or more synthetic dataset including data other than data collected by the enterprise, wherein the examining the enterprise dataset includes subjecting the enterprise dataset to processing for extraction of enterprise dataset characterizing parameter values and comparing the enterprise dataset characterizing parameter values to respective sets of synthetic dataset characterizing parameter values stored in a data repository, wherein the respective sets of synthetic dataset characterizing parameter values characterize respective synthetic datasets stored in the data repository, wherein the selecting one or more synthetic dataset in dependence on the examining includes identifying from the comparing at least one synthetic dataset stored in the data repository having a threshold satisfying similarity with the enterprise dataset and identifying from the respective synthetic datasets stored in the data repository a highest ranked synthetic dataset having a greatest similarity to the enterprise dataset amongst the respective synthetic datasets stored in the data repository, and wherein the selecting one or more synthetic dataset in dependence on the examining includes performing the selecting so that the selected one or more synthetic dataset have the threshold satisfying similarity with the enterprise dataset and include the highest ranked synthetic dataset having the greatest similarity to the enterprise dataset amongst the respective synthetic datasets stored in the data repository;

training a set of predictive models using data of the selected one or more synthetic dataset having the threshold satisfying similarity with the enterprise dataset and including the highest ranked synthetic dataset having the greatest similarity to the enterprise dataset amongst the respective synthetic datasets stored in the data repository to provide a set of trained predictive models;

testing the set of trained predictive models with use of holdout data of the one or more synthetic dataset; and presenting prompting data on a displayed user interface of a developer user in dependence on result data resulting from the testing, the prompting data prompting the developer user to direct action with respect to one or more model of the set of predictive models, wherein the prompting data prompting the developer user to direct action with respect to one or more model of the set of predictive models includes prompting data prompting the developer user to select, in dependence on data of the result data, a certain synthetic dataset for training and testing a certain predictive model of the set of predictive models, wherein the user interface guides the developer user by presenting a recommended datasets text area displaying recommended synthetic datasets including a highlighted dataset indicator distinguishing a recommended dataset from other candidate datasets, and restricts the developer user from selecting an unrecommended dataset for a predictive model such that, during a subsequent iteration, different predictive models are trained on differentiated synthetic datasets.

16. The computer program product of claim 15, wherein testing the set of trained predictive models includes generating a ranked listing of model specific performance metrics, and wherein the user interface presents a model identifier text area that displays the ranked listing to visually correlate each predictive model with its respective performance metric.

17. The computer program product of claim 15, wherein the user interface presents a results visualization area that plots predicted signals produced by multiple predictive models alongside a ground truth signal to enable qualitative comparison of model behavior over a shared time axis.

18. The computer program product of claim 15, wherein the user interface presents a model attributes text area that displays attributes including model type, capacity, and training iteration count, and dynamically updates the displayed attributes in dependence on testing result data.

19. The computer program product of claim 15, wherein the presenting prompting data includes displaying integrated visual guidance that correlates model specific error signals with dataset selection information derived from the testing, enabling the developer user to interpret relationships between error behavior and training data characteristics.

20. The computer program product of claim 15, wherein the presenting prompting data includes querying a machine learning trained model that is trained to predict a next dataset for training a predictive model of the set of predictive models, wherein the trained model is configured using crowdsourced developer action data identifying historical developer selections of synthetic datasets.

* * * * *